(12) United States Patent
Mowatt et al.

(10) Patent No.: US 9,972,317 B2
(45) Date of Patent: May 15, 2018

(54) CENTRALIZED METHOD AND SYSTEM FOR CLARIFYING VOICE COMMANDS

(71) Applicant: Microsoft Technology Licensing, LLC, Redmond, WA (US)

(72) Inventors: David Mowatt, Dublin (IE); Robert L. Chambers, Issaquah, WA (US); Felix G. T. I. Andrew, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 121 days.

(21) Appl. No.: 14/563,255

(22) Filed: Dec. 8, 2014

(65) Prior Publication Data

US 2015/0095030 A1    Apr. 2, 2015

Related U.S. Application Data

(63) Continuation of application No. 10/990,345, filed on Nov. 16, 2004, now Pat. No. 8,942,985.

(51) Int. Cl.
*G10L 15/00* (2013.01)
*G10L 15/04* (2013.01)
(Continued)

(52) U.S. Cl.
CPC ............ *G10L 15/22* (2013.01); *G06F 3/167* (2013.01); *G10L 15/18* (2013.01); *G10L 2015/223* (2013.01)

(58) Field of Classification Search
CPC .. G06F 3/0482; G06F 3/167; G06F 17/30654; G06F 17/2785; G06F 17/28;
(Continued)

(56) References Cited

U.S. PATENT DOCUMENTS 5,041,967 A    8/1991   Ephrath et al.
5,231,691 A    7/1993   Yasuda
(Continued)

FOREIGN PATENT DOCUMENTS

EP    0503944 A2    9/1992
EP    0317479 B1    1/1997
(Continued)

OTHER PUBLICATIONS

McGee, et al., "Confirmation in Multimodal Systems", In Proceedings of the 36th Annual Meeting of the Association for Computational Linguistics and 17th International Conference on Computational Linguistics, vol. 2, Aug. 10, 1998, 7 Pages.
(Continued)

*Primary Examiner* — Michael Ortiz Sanchez
(74) *Attorney, Agent, or Firm* — Christopher J. Volkmann; Kelly, Holt & Christenson, PLLC

(57) ABSTRACT

A method and system for facilitating centralized interaction with a user includes providing a recognized voice command to a plurality of application modules. A plurality of interpretations of the voice command are generated by at least one of the plurality of application modules. A centralized interface module visually renders the plurality of interpretations of the voice command on a centralized display. An indication of selection of an interpretation is received from the user.

20 Claims, 14 Drawing Sheets

(51) Int. Cl.
*G10L 15/22* (2006.01)
*G06F 3/16* (2006.01)
*G10L 15/18* (2013.01)

(58) Field of Classification Search
CPC .... G06F 17/27; H04M 2201/40; G10L 15/26; G10L 15/1815; G10L 15/19; G10L 2015/223; G10L 15/00; G10L 2015/088; G10L 21/06; G10L 15/22; G10L 15/063; G10L 2015/0638; G10L 15/18; G10L 15/30; G10L 15/265; G10L 21/00; G10L 17/22; G10L 21/10
See application file for complete search history.

(56) References Cited

U.S. PATENT DOCUMENTS

| | | |
|---|---|---|
| 5,265,065 A | 11/1993 | Turtle |
| 5,632,002 A | 5/1997 | Hashimoto et al. |
| 5,748,973 A | 5/1998 | Palmer et al. |
| 5,748,974 A | 5/1998 | Johnson |
| 5,799,276 A | 8/1998 | Komissarchik et al. |
| 5,850,627 A * | 12/1998 | Gould ............ G09B 19/04 704/231 |
| 5,852,801 A | 12/1998 | Hon et al. |
| 5,890,122 A * | 3/1999 | Van Kleeck ............ G10L 15/26 704/235 |
| 6,014,138 A | 1/2000 | Cain et al. |
| 6,026,388 A | 2/2000 | Liddy et al. |
| 6,044,347 A | 3/2000 | Abella et al. |
| 6,064,959 A | 5/2000 | Young et al. |
| 6,073,102 A | 6/2000 | Block |
| 6,078,914 A | 6/2000 | Redfern |
| 6,085,159 A | 7/2000 | Ortega et al. |
| 6,088,692 A | 7/2000 | Driscoll |
| 6,125,347 A * | 9/2000 | Cote ............ G10L 15/26 704/270 |
| 6,192,339 B1 * | 2/2001 | Cox ............ G10L 15/30 704/270 |
| 6,192,343 B1 | 2/2001 | Morgan et al. |
| 6,199,061 B1 | 3/2001 | Blewett et al. |
| 6,233,559 B1 | 5/2001 | Balakrishnan |
| 6,262,730 B1 | 7/2001 | Horvitz et al. |
| 6,289,312 B1 | 9/2001 | Raman |
| 6,308,157 B1 * | 10/2001 | Vanbuskirk ............ G10L 15/26 704/240 |
| 6,330,577 B1 | 12/2001 | Kim |
| 6,374,226 B1 * | 4/2002 | Hunt ............ G10L 15/26 704/255 |
| 6,442,522 B1 | 8/2002 | Carberry et al. |
| 6,446,135 B1 | 9/2002 | Koppolu et al. |
| 6,493,702 B1 | 12/2002 | Adar et al. |
| 6,535,854 B2 | 3/2003 | Buchner et al. |
| 6,539,078 B1 | 3/2003 | Hunt et al. |
| 6,542,163 B2 | 4/2003 | Gorbet et al. |
| 6,604,075 B1 | 8/2003 | Brown et al. |
| 6,615,177 B1 | 9/2003 | Rapp et al. |
| 6,618,726 B1 | 9/2003 | Colbath et al. |
| 6,693,651 B2 | 2/2004 | Biebesheimer et al. |
| 6,728,700 B2 | 4/2004 | Richards et al. |
| 6,744,451 B1 | 6/2004 | Anderson et al. |
| 6,778,193 B2 | 8/2004 | Biebesheimer et al. |
| 6,839,669 B1 | 1/2005 | Gould et al. |
| 6,839,896 B2 | 1/2005 | Coffman et al. |
| 6,847,959 B1 | 1/2005 | Arrouye et al. |
| 6,948,133 B2 | 9/2005 | Haley |
| 6,948,135 B1 | 9/2005 | Ruthfield et al. |
| 6,985,865 B1 | 1/2006 | Packingham et al. |
| 7,043,700 B1 | 5/2006 | Bertram et al. |
| 7,062,711 B2 | 6/2006 | Kethireddy |
| 7,069,220 B2 | 6/2006 | Coffman et al. |
| 7,073,126 B1 | 7/2006 | Khandekar |
| 7,113,950 B2 | 9/2006 | Brill et al. |
| 7,120,582 B1 | 10/2006 | Young et al. |
| 7,124,129 B2 | 10/2006 | Bowman et al. |
| 7,130,790 B1 | 10/2006 | Flanagan et al. |
| 7,133,950 B2 | 11/2006 | Olukotun |
| 7,137,071 B2 | 11/2006 | Fuller et al. |
| 7,149,550 B2 | 12/2006 | Kraft et al. |
| 7,185,001 B1 | 2/2007 | Burdick et al. |
| 7,206,747 B1 | 4/2007 | Morgan et al. |
| 7,231,642 B2 | 6/2007 | Araki et al. |
| 7,254,539 B2 | 8/2007 | Carberry et al. |
| 7,254,784 B2 | 8/2007 | Chang |
| 7,440,941 B1 | 10/2008 | Borkovsky et al. |
| 7,505,910 B2 | 3/2009 | Kujirai |
| 7,539,939 B1 | 5/2009 | Schomer |
| 7,596,754 B2 | 9/2009 | Wessling et al. |
| 7,684,985 B2 | 3/2010 | Dominach et al. |
| 7,703,037 B2 | 4/2010 | McGlinchey et al. |
| 7,925,975 B2 | 4/2011 | Bala et al. |
| 8,185,427 B2 | 5/2012 | Messer et al. |
| 8,370,743 B2 | 2/2013 | Bala |
| 8,942,985 B2 | 1/2015 | Mowatt et al. |
| 9,632,650 B2 | 4/2017 | Bala |
| 2001/0044726 A1 | 11/2001 | Li et al. |
| 2002/0048350 A1 | 4/2002 | Phillips et al. |
| 2002/0052870 A1 | 5/2002 | Charlesworth et al. |
| 2002/0080157 A1 | 6/2002 | Chickles et al. |
| 2002/0103789 A1 | 8/2002 | Turnbull et al. |
| 2002/0105550 A1 | 8/2002 | Biebesheimer et al. |
| 2002/0118220 A1 | 8/2002 | Lui et al. |
| 2002/0133354 A1 * | 9/2002 | Ross ............ G10L 15/30 704/275 |
| 2002/0152255 A1 | 10/2002 | Smith et al. |
| 2002/0156629 A1 * | 10/2002 | Carberry ............ G10L 15/1822 704/257 |
| 2002/0161584 A1 | 10/2002 | Lewis et al. |
| 2002/0188612 A1 | 12/2002 | Yu et al. |
| 2002/0194164 A1 | 12/2002 | Morrow et al. |
| 2002/0198714 A1 | 12/2002 | Zhou |
| 2003/0004941 A1 | 1/2003 | Yamada et al. |
| 2003/0014260 A1 * | 1/2003 | Coffman ............ G10L 15/26 704/275 |
| 2003/0016238 A1 | 1/2003 | Sullivan et al. |
| 2003/0046088 A1 | 3/2003 | Yuschik |
| 2003/0171928 A1 * | 9/2003 | Falcon ............ G10L 15/22 704/275 |
| 2003/0171929 A1 | 9/2003 | Falcon et al. |
| 2003/0177013 A1 | 9/2003 | Falcon et al. |
| 2003/0200254 A1 | 10/2003 | Wei |
| 2003/0234818 A1 | 12/2003 | Schmid et al. |
| 2004/0046789 A1 | 3/2004 | Inanoria |
| 2004/0073540 A1 | 4/2004 | Wang et al. |
| 2004/0095263 A1 | 5/2004 | Hwang et al. |
| 2004/0193426 A1 | 9/2004 | Maddux et al. |
| 2004/0243415 A1 | 12/2004 | Commarford et al. |
| 2004/0260562 A1 | 12/2004 | Kujirai |
| 2005/0027539 A1 | 2/2005 | Weber et al. |
| 2005/0060138 A1 | 3/2005 | Wang et al. |
| 2005/0066270 A1 | 3/2005 | Ali et al. |
| 2005/0071777 A1 | 3/2005 | Roessler et al. |
| 2005/0075857 A1 | 4/2005 | Elcock et al. |
| 2005/0076023 A1 | 4/2005 | Wu et al. |
| 2005/0081152 A1 | 4/2005 | Commarford et al. |
| 2005/0108026 A1 | 5/2005 | Brierre et al. |
| 2005/0114319 A1 | 5/2005 | Brent et al. |
| 2005/0131691 A1 * | 6/2005 | Fischer ............ G10L 15/26 704/246 |
| 2005/0131701 A1 | 6/2005 | Cross et al. |
| 2005/0138559 A1 | 6/2005 | Santos-Gomez et al. |
| 2005/0166148 A1 | 7/2005 | Garding |
| 2005/0185773 A1 * | 8/2005 | Burger ............ H04M 7/006 379/88.22 |
| 2005/0240558 A1 | 10/2005 | Gil et al. |
| 2005/0278728 A1 | 12/2005 | Klementiev |
| 2005/0283473 A1 | 12/2005 | Rousso et al. |
| 2006/0036438 A1 | 2/2006 | Chang |
| 2006/0048060 A1 | 3/2006 | Mohr et al. |
| 2006/0053384 A1 | 3/2006 | La Fetra et al. |
| 2006/0101347 A1 | 5/2006 | Runov et al. |
| 2006/0106614 A1 | 5/2006 | Mowatt et al. |
| 2006/0136195 A1 | 6/2006 | Agapi et al. |
| 2006/0143575 A1 | 6/2006 | Sauermann |

(56) References Cited

U.S. PATENT DOCUMENTS

| | | | |
|---|---|---|---|
| 2006/0150112 | A1 | 7/2006 | Marchev |
| 2006/0155687 | A1 | 7/2006 | Chou |
| 2006/0167851 | A1 | 7/2006 | Ivanov |
| 2006/0168522 | A1 | 7/2006 | Bala |
| 2006/0184899 | A1 | 8/2006 | Klassen et al. |
| 2006/0190256 | A1 | 8/2006 | Stephanick et al. |
| 2006/0190429 | A1 | 8/2006 | Sidlosky et al. |
| 2006/0200827 | A1 | 9/2006 | Sidlosky et al. |
| 2006/0241995 | A1 | 10/2006 | McGlinchey et al. |
| 2006/0259479 | A1 | 11/2006 | Dai |
| 2007/0033172 | A1 | 2/2007 | Williams et al. |
| 2007/0038601 | A1 | 2/2007 | Guha |
| 2007/0143704 | A1 | 6/2007 | Laird-McConnell |
| 2007/0189724 | A1 | 8/2007 | Wan et al. |
| 2007/0198267 | A1* | 8/2007 | Jones ............... G06F 17/30637 704/257 |
| 2008/0065617 | A1 | 3/2008 | Burke et al. |
| 2013/0205241 | A1 | 8/2013 | Bala |
| 2014/0317578 | A1* | 10/2014 | Chaudhri ........... G06F 3/04817 715/863 |
| 2017/0032786 | A1 | 2/2017 | Mowatt et al. |

FOREIGN PATENT DOCUMENTS

| | | |
|---|---|---|
| EP | 911808 | 4/1999 |
| EP | 1045374 | 10/2000 |
| EP | 1215657 A2 | 6/2002 |
| EP | 1246430 A2 | 10/2002 |
| EP | 1603031 A2 | 12/2005 |
| JP | 2001-034289 | 9/2001 |
| JP | 2002-182688 | 6/2002 |
| JP | 2003-084794 | 3/2003 |
| JP | 2004-110613 | 4/2004 |
| JP | 2004-234273 | 8/2004 |
| WO | 9525326 | 9/1995 |
| WO | WO 9735253 A1 | 9/1997 |
| WO | WO 0144932 A1 | 6/2001 |
| WO | WO 0175579 A2 | 10/2001 |
| WO | WO 0212982 A2 | 2/2002 |
| WO | 2002075538 | 9/2002 |

OTHER PUBLICATIONS

Mankoff, Jennifer, "Proposal of a Model Architecture Handling Ambiguity in Recognition-Based Input", Dissertation Submitted in Partial Fulfillment of the Requirement for the Degree of Doctor of Philosophy in College Computing, 1999, 55 Pages.

Mankoff, et al., "Interaction Techniques for Ambiguity Resolution in Recognition-Based Interfaces", In Proceedings of the 13th Annual ACM Symposium on User Interface Software and Technology, 2000, 10 Pages.

Libuda, Lars: "Improving clarification dialogs in speech command systems with the help of user modeling: A conceptualization for an in-car user interface", Proceedings of the GI-Workshop, 2001, 5 pages.

Issue Notification for U.S. Appl. No. 10/990,345 dated Jan. 7, 2015, 1 page.

Office Action from India Patent Application No. 2345/DEL/2005 dated Nov. 25, 2014. 2 pages.

Third Chinese Office Action for Chinese Application No. 200510116339.9 dated May 3, 2012, 6 pages.

Second Chinese Office Action for Chinese Application No. 200510116339.9 dispatch dated Feb. 3, 2012, 6 pages.

Notice of Rejection for Japanese Patent Application No, 2005-299982 dated May 24, 2011 with English Translation, 6 pages.

Reithinger, Norbert, et al. "SmartKom: adaptive and flexible multimodal access to multiple applications." Proceedings of the 5th international conference on Multimodal interfaces. ACM, 2003. 8 pages.

European Search Report dated Nov. 8. 2005 for Application No. 05106352.7, 5 pages.

Potamitis, Ilyas, et al. "An integrated system for smart-home control of appliances based on remote speech interaction." INTERSPEECH. 2003. 5 pages.

European Search Report dated Mar. 21, 2006 or Application No. 05109794.7, 7 pages.

Chang, Eric, "Efficient multimodal method to provide input to a computing device." U.S. Appl. No. 10/889,822, 34 pages.

Chang, Eric, et al. "A system for spoken query information retrieval on mobile devices." Speech and Audio Processing, IEEE Transactions on 10.8 (2002): 531-541.

Bostwick et al., "Flexi-modal and multi-machine user interfaces." Proceedings of the 4th IEEE International Conference on Multimodal Interfaces. IEEE Computer Society, 2002. 6 pages.

Kvale, Knut, N. Warakagoda, and Jan Eikeset Knudsen. "Speech centric multimodal interfaces for mobile communication systems." Telektronikk 99.2 (2003): 104-117.

Seide, Frank, et al. "Vocabulary-independent search in spontaneous speech." Acoustics, Speech, and Signal Processing, 2004. Proceedings.(ICASSP'04). IEEE International Conference on. vol. 1. IEEE, 2004. 4 pages.

Manaris, Bill Z., Valanne MacGyvers, and Michail G. Lagoudakis. "Universal Access to Mobile Computing Devices through Speech Input." Flairs Conference. 1999. 7 pages.

Chang, Eric, et al. "Efficient web search on mobile devices with multi-modal input and intelligent text summarization." The 11th Int. WWW Conference. 2002. 4 pages.

Gu, Huixiang, et al. "Spoken Query for Web Search and Navigation." WWW Posters. 2001. 2 pages.

Wasinger, Rainer, Christoph Stahl, and Antonio Krueger. "Robust speech interaction in a mobile environment through the use of multiple and different media input types." The 8th European Conference on Speech Communication and Technology (Eurospeech). 2003. 4 pages.

Iftikhar, Ahmad, et al. "Query by Image Content using Nokia 9210 Communicator." Proc. of the Workshop on Image Analysis for Multimedia Interactive Services, WIAMIS. vol. 1. 2001. 5 pages.

Prosecution History for U.S. Appl. No. 10/990,345 including: Notice of Allowance dated Sep. 10, 2014, Decision on Appeal dated Jun. 11, 2014, Appeal Docketing Notice dated Nov. 10, 2011, Interview Summary dated Sep. 29, 2011, Reply Brief dated Jul. 15, 2011, Examiner's Answer to Appeal Brief dated May 16, 2011 Appeal Brief dated Feb. 14. 2011, Notice of Appeal dated Dec. 6, 2010; Final Office Action dated Aug. 5, 2010, Amendment dated Apr. 29, 2010. Non-Final Office Action dated Feb. 4, 2010, Part 1 of 3.

Prosecution History for U.S. Appl. No. 10/990,345 including: Amendment dated Oct. 21, 2009, Non-Final Office Action dated Jul. 31, 2009, Appeal Brief dated Apr. 16, 2009, Notice of Appeal dated Mar. 2, 2009, Advisory Action dated Jan. 13, 2009, Response After Final dated Dec. 29, 2008, Interview Summary dated Dec. 19, 2008, Final Office Action dated Oct. 28, 2008, Interview Summary dated Jun. 19, 2008, Amendment dated Jun. 17, 2008, Part 2 of 3.

Prosecution History for U.S. Appl. No. 10/990,345 including: Non-Final Office Action dated Mar. 17, 2008, Preliminary Amendment dated Jan. 24, 2008, and Application and Drawings filed Nov. 16, 2004. Part 3 of 3, 401 pages.

Create Rich Client Apps with the Dom. Padilla, pp. 1-7 (Feb. 14, 2004).

Mahesh, K. "Advanced Search Capabilities in Oracle8i intermedia text," Oracle Corporation, Online! Nov. 1999, pp. 1-6.

Davidson, J. Running Mac OS X Panther, Dec. 2003. 1st Edition, Ch. 2.

Bass & Bunker, L. & R.: A Generalized User Interface for Applications Programs,' Communications of the ACM, V. 24. No. 12, Dec. 1981, pp. 798-800.

Shneiderman, B.; "Clarifying Search: A User-Interface Framework for Text Searches." D-Lib Magazine, Jan. 1997, pp. 1-18

First Chinese Office Action for Patent No. 200510116339.9, dated Jul. 25, 2008, 5 pages.

Prosecution History for U.S. Appl. No. 13/732,520 including: Notice of Allowanced dated Nov. 2, 2016, Amendment dated Aug. 19, 2016, Terminal Disclaimer dated Aug. 19, 2016, Terminal Disclaimer Review Decision dated Aug. 19, 2016, Non-Final Office

(56) References Cited

OTHER PUBLICATIONS

Action dated May 12, 2016, Amendment dated Feb. 22, 2016, Non-Final Office Action dated Oct. 22, 2015, Amendment dated Oct. 7, 2015, and Non-Final Office Action dated Jun. 25, 2015, 102 pages.
European Application No. 05107831.9-2211 Article 94(3) EPC dated Nov. 17, 2009, 6 pages.
Extended European Search Report for Application No. 07751459. 4-2211, dated Apr. 26, 2010, 8 pages.
XAML—A Business Perspective, <<http://www.xaml.net>>, Jan. 4, 2006, 2 pgs.
Raman, T.V.:, "Speech-Enablement of Eclipse IDE and Eclipse Rich Client Applications Using AspectJ", IBM Search, Accessed Feb. 10, 2011, 13 pages.
PCT Search Report, PCT/US2007/004699, Filed Feb. 23, 2007, 3 pages.
European Search Report for Application No. 05107831.9, dated Mar. 15, 2006, 3 pages.
Chinese First official Action for Application No. 2005101036571, dated Apr. 10, 2009, 13 pages.
Prosecution History for U.S. Appl. No. 11/701,125 including: Issue Notification dated Jan. 16, 2013, Notice of Allowance dated Oct. 2, 2012, Amendment dated Sep. 19, 2012, Final Office Action dated Aug. 29, 2012, Amendment dated May 21, 2012, Non-Final Office Action dated Mar. 13, 2012, Amendment with RCE dated Mar. 23, 2011, Final Office Action dated Nov. 15, 2010, Amendment dated Sep. 17, 2010, Non-Final Office Action dated Jun. 10, 2010, Part 1 of 2.
Prosecution History for U.S. Appl. No. 11/701,125 including: Amendment with RCE dated Apr. 21, 2010, Final Office Action dated Feb. 16, 2010, Amendment dated Nov. 20, 2009, Non-Final Office Action dated Sep. 11, 2009 and Application and Drawings filed Feb. 1, 2007, Part 2 of 2, 256 pages.
Prosecution History for U.S. Appl. No. 11/372,545 including: Issue Notification dated Mar. 23, 2011, Notice of Allowance dated Dec. 17, 2010, Amendment dated Sep. 21, 2010, Non-Final Office Action dated Jul. 8, 2010, Amendment with RCE dated May 14, 2010, Final Office Action dated Feb. 2, 2010, Amendment dated Nov. 17, 2009, Non-Final Office Aciton dated Aug. 3, 2009, Advisory Action dated Feb. 27, 2009, Amendment with RCE dated Feb. 17, 2009, Part 1 or 2.
Prosecution History for U.S. Appl. No. 11/372,545 including: Final Office Action dated Nov. 28, 2008, Amendment dated Sep. 15, 2008, Non-Final Office Action dated Apr. 17, 2008 and Application and Drawings filed Mar. 10, 2006, Part 2 of 2, 178 pages.
Prosecution History for U.S. Appl. No. 11/109,997 including: Issue Notification dated Mar. 31, 2010, Notice of Allowance dated Feb. 22, 2010, Amendment dated Dec. 14, 2009, Non-Final Office Action dated Sep. 24, 2009, Amendment with RCE dated Jun. 30, 2009, Final Office Action dated Mar. 20, 2009, Interview Summary dated Jan. 23, 2009, Amendment dated Jan. 15, 2009, Non-Final Office Action dated Oct. 15, 2008, Amerndment with RCE dated Jul. 29, 2008, Part 1 of 2.
Prosecution History for U.S. Appl. No. 11/109,997 including: Advisory Action dated May 30, 2008, Amendment dated May 21, 2008, Interview Summary dated Apr. 17, 2008, Final Office Action dated Feb. 21, 2008, Amendment dated Nov. 21, 2007, Non-Final Office Action dated Sep. 7, 2007 and Application and Drawings filed Apr. 20, 2005, Part 2 of 2, 206 pages.
Application and Drawings for U.S. Appl. No. 15/458,337, filed Mar. 14, 2017, 59 pages.
"Notice of Allowance Issued in European Patent Application No. 05109794.7", dated Sep. 9, 2009, 9 Pages.
"Office Action Issued in European Patent Application No. 05109794.7", dated Nov. 23, 2006, 4 Pages.
"Notice of Allowance Issued in U.S. Appl. No. 10/990,345", dated Dec. 18, 2014, 2 Pages.
"Notice of Allowance Issued in Korean Patent Application No. 10-2005-0089717", dated Feb. 27, 2012, 2 Pages. (W/o English Translation).
"Decision on Rejection Issued in Chinese Patent Application No. 200510116339.9" dated Jul. 3, 2009, 5 Pages.
"Notice of Allowance Issued in Chnese Patent Application No. 200510116339.9" dated Sep. 5, 2012,4 Pages.
"Office Action Issued in Chinese Patent Application No. 200510116339.9", dated Jan. 9, 2012 7 Pages.
"Notice of Allowane Issued in Japanese Patent Application No. 2005-299982", dated Sep. 27, 2011, 6 Pages.
Notice of Allowance for U.S. Appl. No. 13/732,520 dated Jan. 25, 2017, 7 pages.
Little & Miller, G&R.:, "Translating Keyword Commands into Executable Code", UIST'06, Oct. 15-18, 2006, Switzerland, 10 pages.
Ng, et al., "Integrating Multiple Knowledge Sources to Disambiguate Word Sense: An Exemplar-Based Approach", In Proceedings of the 34th Annual Meeting on Association for Computational Linguistics, Jun. 24, 1996, pp. 40-47.
"Non-Finai Office Action Issued in U.S Appl. No. 15/292,871", dated Dec. 15, 2017, 16 Pages.

\* cited by examiner

CENTRALIZED METHOD AND SYSTEM FOR CLARIFYING VOICE COMMANDS

CROSS-REFERENCE TO RELATED APPLICATION

The present application is a continuation of and claims priority of U.S. patent application Ser. No. 10/990,345, filed Nov. 16, 2004, the content of which is hereby incorporated by reference in its entirety.

BACKGROUND

The present invention generally pertains to user interaction with a computing device. More specifically, the present invention pertains to user interactions with a centralized interface in the context of speech recognition.

Much attention, lately, has been directed towards the improvement of speech recognition technology. One such challenge in speech recognition technology lies in user interaction with a computing device using voice commands. Frequently, a voice command needs further clarification before the computing device can execute such a command.

A computing device can often interpret a voice command in multiple ways. In one aspect, a computing device may not understand which application the voice command is directed towards. For example, a voice command can include terms that are used across a plurality of application modules. In another aspect, an application may not understand what the user would like to execute because the voice command contains ambiguous information. For example, a voice command can include "play the Beatles" when there are multiple Beatles albums that the application could play. In still another example, the voice command can contain a misrecognition error. For example, the user may recite the command "insert ice cream" while the speech recognition system recognizes the command as "insert I scream".

Making guesses at what the user meant or taking action without consulting the user can lead to frustration for a user. There is a need to provide the user with the tools to control the clarification of voice commands and clarification of misrecognition errors without causing undue frustration and sacrificing speech recognition efficiency.

SUMMARY

A method and system is provided for facilitating centralized interaction with a user. The method and system includes providing a recognized voice command to a plurality of application modules. A plurality of interpretations of the voice command are generated by at least one of the plurality of application modules. A centralized interface module visually renders the plurality of interpretations of the voice command on a centralized display. An indication of selection of an interpretation is received from the user.

A centralized interface module that visually renders a list of interpretations to a user when there is otherwise ambiguity in a voice command avoids the arbitrary guessing of a command with which the user is referencing. In addition, a centralized display panel provided by a central interface module can allow generic user interaction.

DETAILED DESCRIPTION OF ILLUSTRATIVE EMBODIMENTS

The present invention is described in the context of a computer-implemented system which uses speech recognition to recognize voice commands from a user. Before describing aspects of the present invention, however, it may be useful to describe suitable computing environments that can incorporate and benefit from these aspects.

Figure 1:
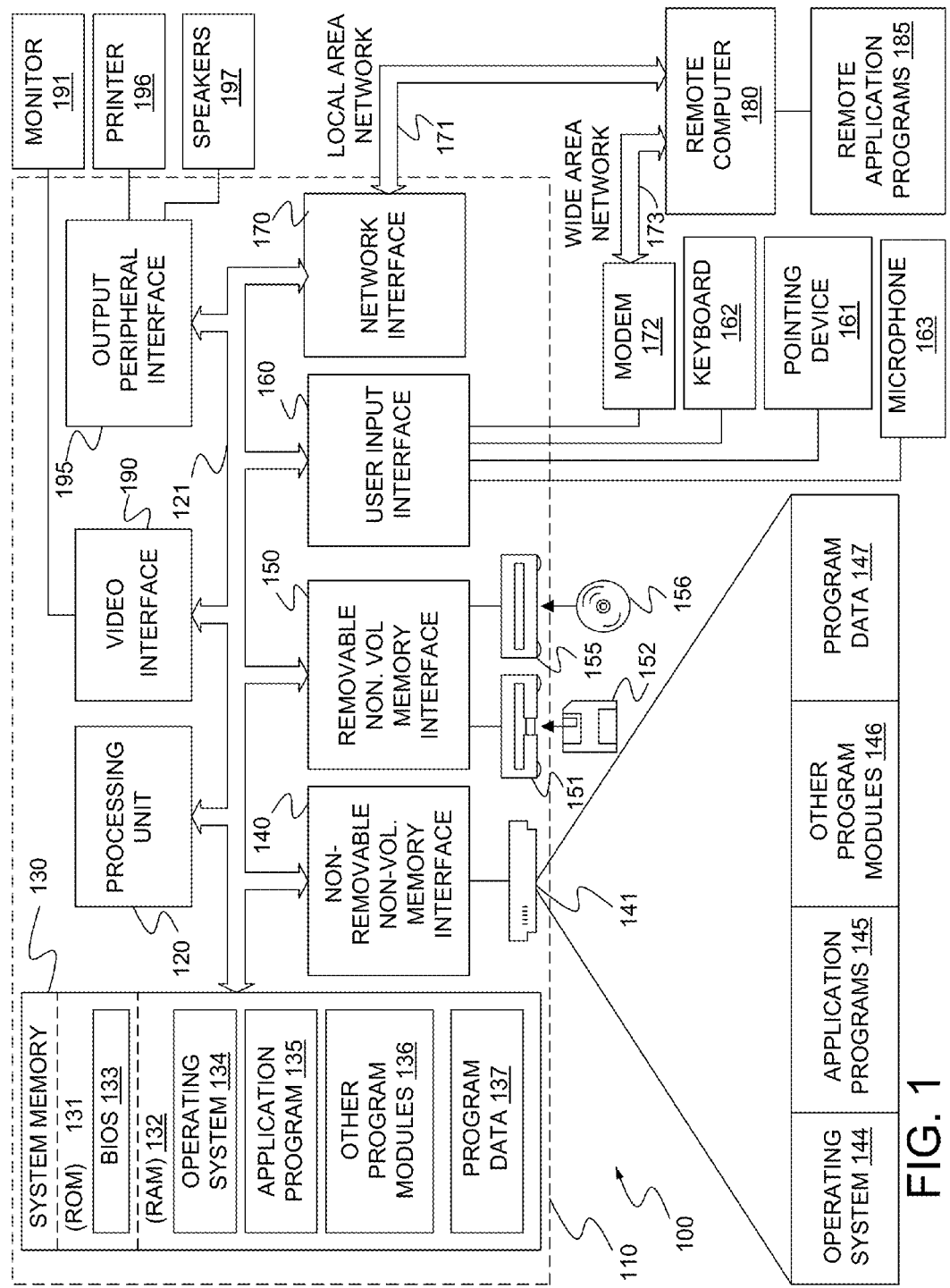
FIG. 1 illustrates a block diagram of a general computing environment in which the present invention can be practiced.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well-known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, telephony systems, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communication network. In a distributed computing environment, program modules may be located in both local and remote computer storage media including memory storage devices. Tasks performed by the programs and modules are described below and with the aid of figures. Those skilled in the art can implement the description and figures provided herein as processor executable instructions, which can be written on any form of a computer readable medium.

With reference to FIG. 1, an exemplary system for implementing the invention includes a general-purpose computing device in the form of a computer 110. Components of computer 110 may include, but are not limited to, a processing unit 120, a system memory 130, and a system bus 121 that couples various system components including the system memory to the processing unit. System bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies.

A user may enter commands and information into the computer 110 through input devices such as a keyboard 162, a microphone 163, and a pointing device 161, such as a mouse, trackball or touch pad. Other input devices (not shown) may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 is operated in a networked environment using logical connections to one or more remote computers, such as a remote computer 180. The remote computer 180 may be a personal computer, a hand-held device, a server, a router, a network PC, a peer device or other common network node, and typically includes many or all of the elements described above relative to the computer 110. The logical connections depicted in FIG. 1 include a local area network (LAN) 171 and a wide area network (WAN) 173, but may also include other networks. Such networking environments are commonplace in offices, enterprise-wide computer networks, Intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on remote computer 180. It will be appreciated that the network connections shown are exemplary and other means of establishing a communications link between the computers may be used.

Figure 2:
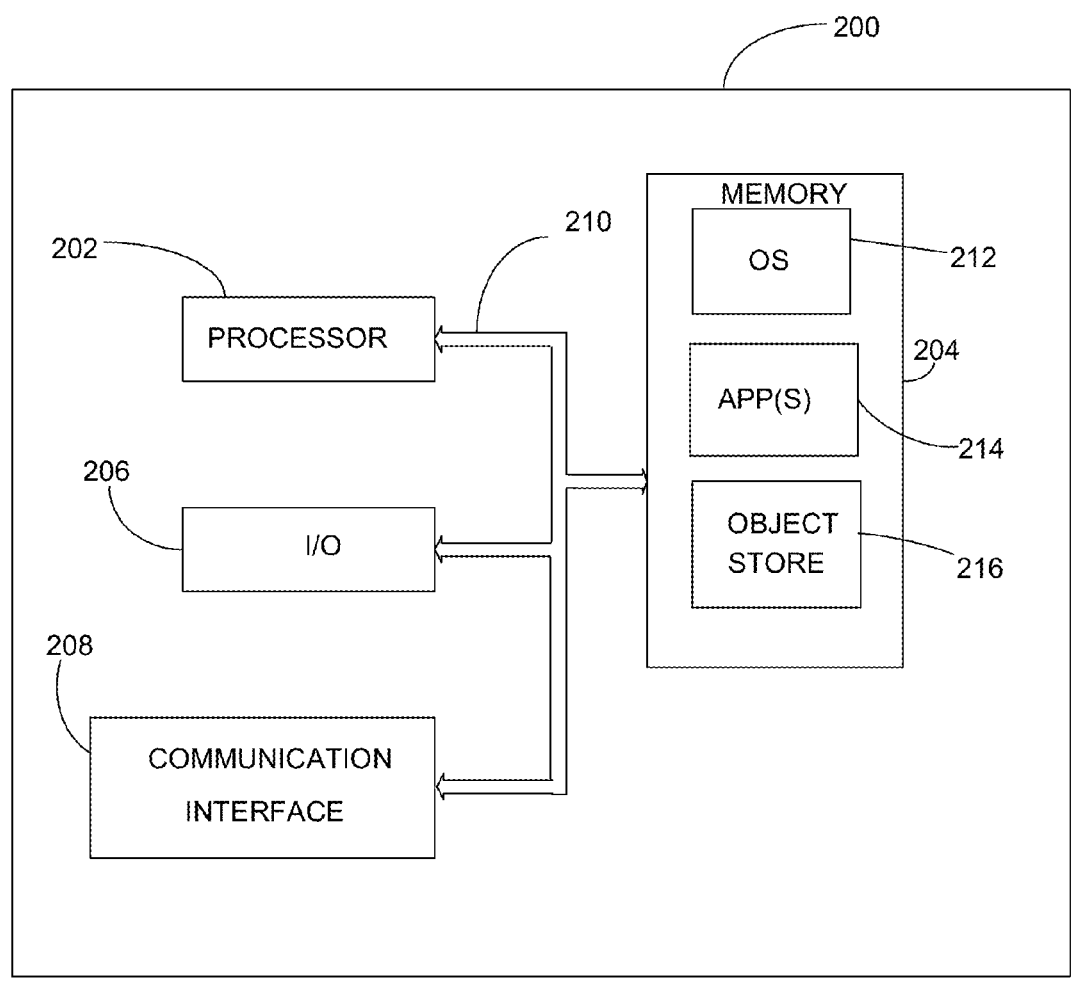
FIG. 2 illustrates a block diagram of a mobile device in which the present invention can be practiced.

FIG. 2 is a block diagram of a mobile device 200, which is another applicable computing environment. Mobile device 200 includes a microprocessor 202, memory 204, input/output (I/O) components 206, and a communication interface 208 for communicating with remote computers or other mobile devices. In one embodiment, the aforementioned components are coupled for communication with one another over a suitable bus 210.

Memory 204 is implemented as non-volatile electronic memory such as random access memory (RAM) with a battery back-up module (not shown) such that information stored in memory 204 is not lost when the general power to mobile device 200 is shut down. A portion of memory 204 is preferably allocated as addressable memory for program execution, while another portion of memory 204 is preferably used for storage, such as to simulate storage on a disk drive.

Memory 204 includes an operating system 212, application programs 214 as well as an object store 216. During operation, operating system 212 is preferably executed by processor 202 from memory 204. Operating system 212, in one preferred embodiment, is a WINDOWS® CE brand operating system commercially available from Microsoft Corporation. Operating system 212 is preferably designed for mobile devices, and implements database features that can be utilized by applications 214 through a set of exposed application programming interfaces and methods. The objects in object store 216 are maintained by applications 214 and operating system 212, at least partially in response to calls to the exposed application programming interfaces and methods.

Communication interface 208 represents numerous devices and technologies that allow mobile device 200 to send and receive information. The devices include wired and wireless modems, satellite receivers and broadcast tuners to name a few. Mobile device 200 can also be directly connected to a computer to exchange data therewith. In such cases, communication interface 208 can be an infrared transceiver or a serial or parallel communication connection, all of which are capable of transmitting streaming information.

Input/output components 206 include a variety of input devices such as a touch-sensitive screen, buttons, rollers, and a microphone as well as a variety of output devices including an audio generator, a vibrating device, and a display. The devices listed above are by way of example and need not all be present on mobile device 200. In addition, other input/output devices may be attached to or found with mobile device 200 within the scope of the present invention.

Figure 3:
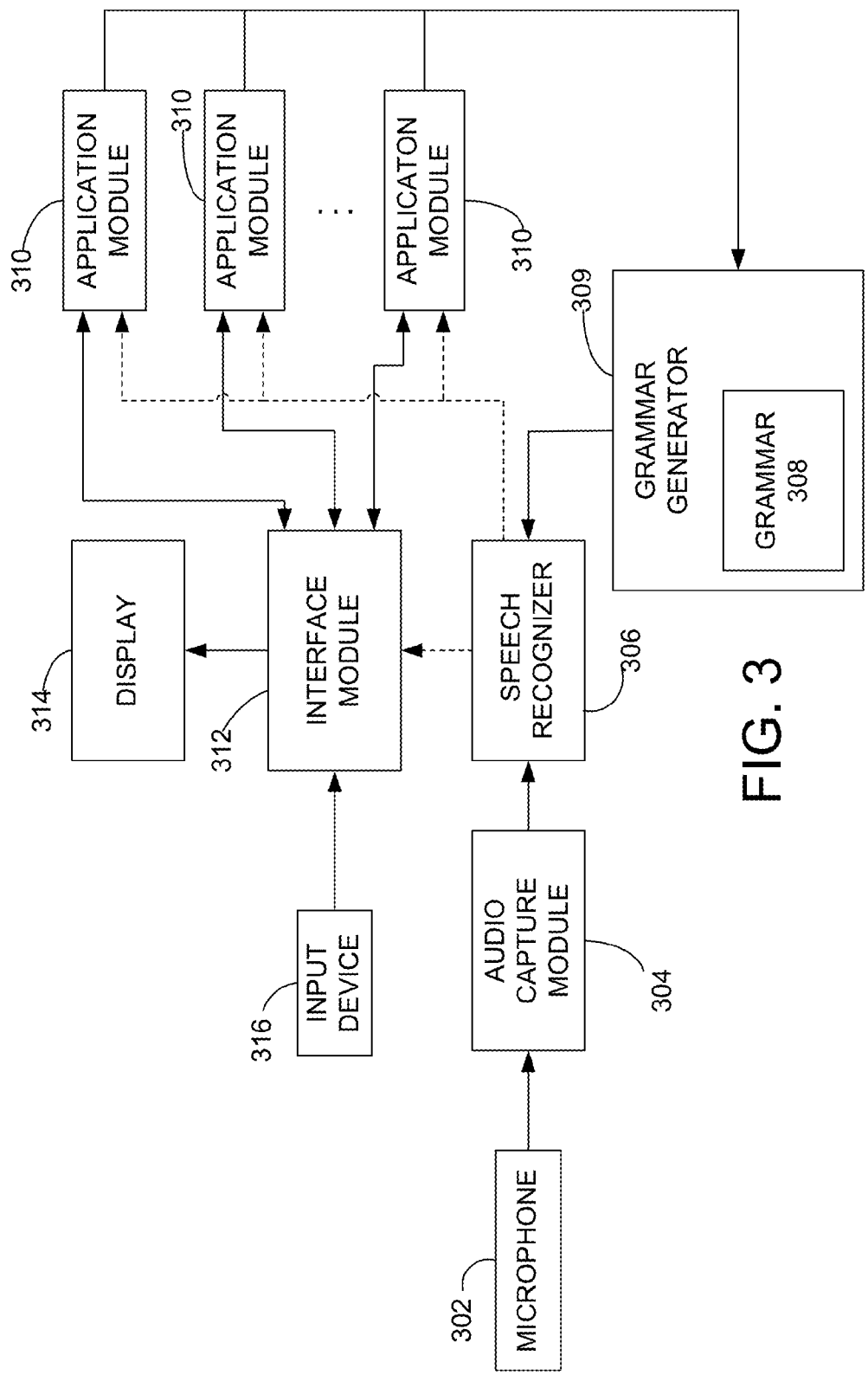
FIG. 3 illustrates a block diagram of a system for facilitating centralized user interaction.

FIG. 3 illustrates a schematic block diagram of a computer-implemented system 300 in accordance with an embodiment of the present invention. System 300 can be incorporated into any of the previously discussed computing environments and includes a microphone 302, an audio capture module 304, a speech recognizer 306, a plurality of installed application modules 310 and a centralized interface module 312. Microphone 302 is configured to receive a voice command from a user. Audio capture module 304 is configured to capture the voice command received by microphone 302 and convey the processed voice command to a speech recognizer 306.

To recognize a voice command, speech recognizer 306 accesses a grammar 308 containing a plurality of recognizable commands. A grammar generator module 309 is configured to generate grammar 308 based on input received from installed and operating application modules 310. The input received from application modules 310 populate grammar 308 and are the executable commands with which the application modules can process and execute various actions. Thus, each recognizable command located in grammar 308 corresponds to a command that executes an action in one of the plurality of application modules 310.

Grammar generator module 309 can also populate grammar 308 with alternative forms of various commands. These alternative forms of commands typically are received from application modules 310. For example, if a user desires to play the Beatles on a computing device, the user should utter "play the Beatles". It is possible, however, that the user may instruct the computing device to "start the Beatles" instead of properly instructing the computing device to "play the Beatles", which would accomplish the same task.

In some embodiments, grammar generator module 309 is further configured to determine which of application modules 310 are operational at any given time. For example, grammar generator module 309 can determine that five application modules are running on the operating system. The operational application modules include two instances of a web browser, an email application, a word processing application and a spreadsheet application. When grammar generator module 309 generates grammar 308, it compresses the commands such that only one set of commands for the web browsing application populate grammar 308. Grammar generator 309, however, retains the notion that there are two instances of the web browser that are operational. Therefore, grammar generator 309 realizes that ambiguity exists at the time of generating grammar 308.

In other embodiments, grammar generator 309 does not retain the notion that there are two instances of the web browser that are operational. In this embodiment, centralized interface module 312 can perform a status check on the operation system to determine if different instances of the same application are operational and, thus, ambiguous.

After speech recognizer 306 recognizes the voice command, the recognized voice command is communicated to the plurality of application modules 310. The recognized voice command can either be communicated to the plurality of application modules via centralized interface module 312 or by speech recognizer 306. Regardless of the path of communication, the plurality of application modules 310 process the recognized voice command.

In accordance with one embodiment of the present invention, some or all of the application modules 310 determine that they can execute the recognized voice command. For example, a user utters the command "start settings". However, many of the application modules 310 that are installed in system 300 could have application aspects that include the term "settings". Therefore the recognized command 310 is ambiguous. It is unclear as to which application the user is referring.

Figure 4:
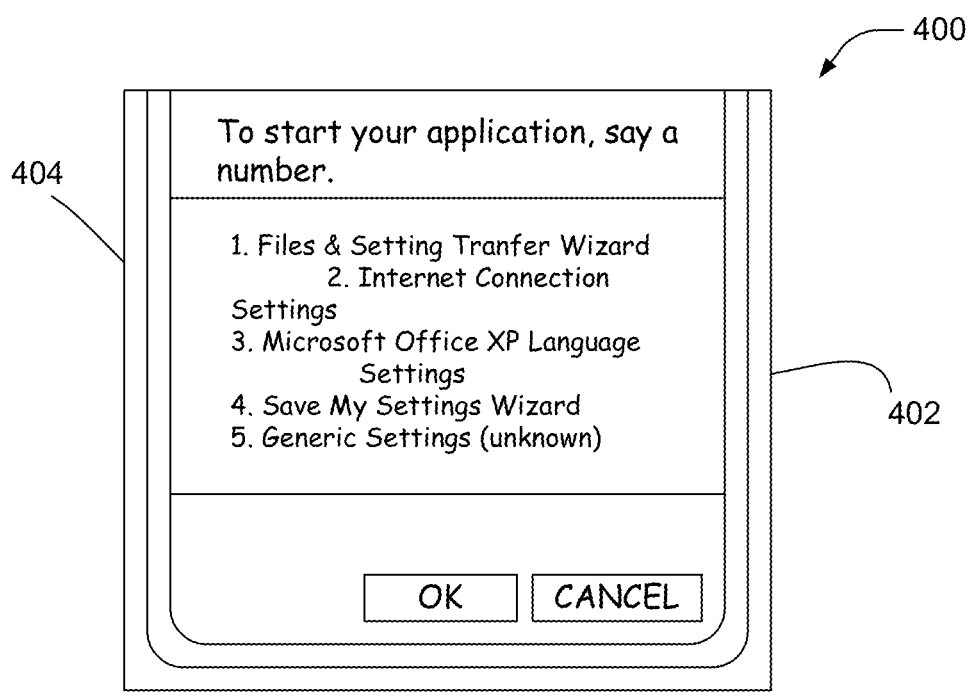
FIG. 4 illustrates an example screenshot of a centralized panel.

In this embodiment, centralized interface module 312 gathers the set of possible interpretations of the recognized voice command from the plurality of application modules 310. Centralized interface module 312 then visually renders the set of interpretations in a list. The list of interpretations are viewed by the user on a centralized panel of display 314. An example screenshot 400 of a centralized panel visually rendering a list of possible interpretations 402 is illustrated in FIG. 4.

In accordance with another embodiment of the present invention, only one of the plurality of application modules 310 determines that it can execute the recognized voice command. For example, a user utters the command "play the Indigo Girls". Only one application module 310, such as a media application, has a menu item that includes "play the Indigo Girls". However, upon the media application attempting to execute the command, it discovers that there are four possible Indigo Girls albums that can be played. Therefore, the recognized command is ambiguous. It is unclear to the media application what album the user meant to play.

Figure 5:
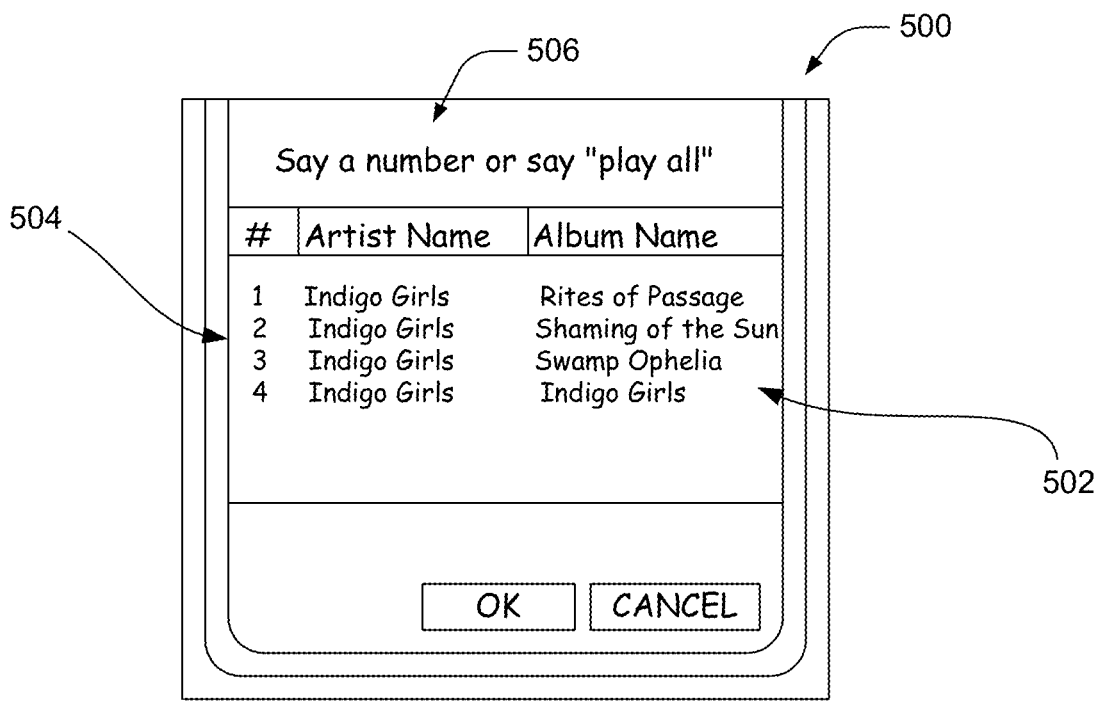
FIG. 5 illustrates an example screenshot of a centralized panel.

In this embodiment, centralized interface module 312 gathers the set of possible interpretations of the recognized voice command from the application module 310. Centralized interface module 312 visually renders the set of interpretations in a list. The list of interpretations are viewed by the user in a centralized panel located on display 314. Example screenshot 500 of a centralized panel visually renders a list of possible interpretations with reference to the described example is illustrated in FIG. 5.

In accordance with yet another embodiment of the present invention and as previously discussed, there can be ambiguity in what instance or application module of a particular application the user is referencing. For example, a user is using a spreadsheet application and utters the command "switch to the Internet browser". However, besides system 300 running one instance of the spreadsheet application, system 300 is also running two instances of the Internet browser application. Therefore, the recognized command is ambiguous. It is unclear which instance of the Internet browser the user is referring.

In this embodiment, speech recognizer 306 can supply centralized interface module 312 with a set of possible interpretations of the voice command based on grammar generator 309 retaining the notion that there are more than one instance of an operational web browser. In the alternative, centralized interface module 312, after performing a status check of the operating system, can supply a set of possible interpretations of the voice command. Centralized interface module 312 visually renders the set of interpretations in a list. The list of interpretations are viewed by the user in a centralized panel located on display 314.

Each interpretation in the list of interpretations 402 and 502 are annotated with an identifier (i.e. "1", "2", "3", etc.). In the FIG. 4 and FIG. 5 embodiment, identifiers 404 and 504 are numeric symbols, although any form of symbol can be used. Upon viewing the list of interpretations 402 and 502, the user can determine which of the interpretations is the interpretation that corresponds to what the user meant. In one embodiment, the user can select the correct command by speaking the corresponding numeric symbol. In another embodiment, the user can select the correct command by using an input device 316 (illustrated in FIG. 3) to select desired interpretations. Input device 316 can be, but is not limited to, a selection apparatus, such as a mouse. Input device 316 can also be a keypad. Regardless of how the correct interpretation is selected, selection of an interpretation induces system 300 to execute the corresponding command by forwarding the command to the corresponding application.

In another embodiment, the user can indicate, in reference to FIG. 5, that playing all of the Indigo Girls albums is desired. Communication line 506 indicates that the user can either select an interpretation from the plurality of interpretations 502 or the user can utter "Play all" to play all of the albums. Regardless of what the user desired, selection of the correct interpretation induces system 300 to take action by providing the command information to the corresponding application.

Figure 6:
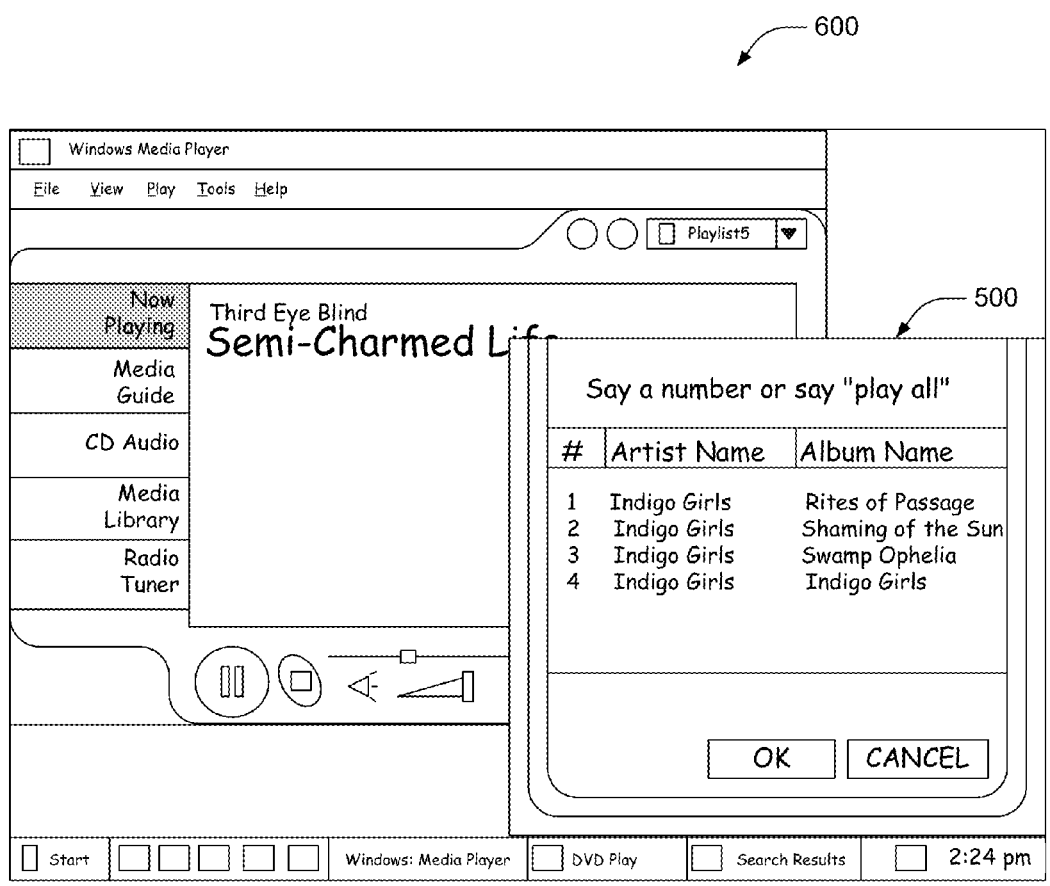
FIG. 6 illustrates an example screenshot of a display of a computing device.

Using a centralized interface module that visually renders a list of interpretations to a user when there is otherwise ambiguity in a voice command provides a way for system 300 to avoid arbitrarily guessing an appropriate command. A centralized interface module also provides a simple centralized panel for graphically representing possible user interactions, provides a highly efficient means of determining what the user meant and provides a consistent interface that is located outside of the plurality of application modules. In other words, each of the screenshots of a centralized panel illustrated in FIGS. 4, 5 and 8-10 (discussed below), look and operate similarly and can, therefore, be displayed in a consistent location. For example, FIG. 6 illustrates a screenshot 600 of a media player that is operating on an operating system. The user asks to "play Indigo Girls". As discussed above, there is more than one album of Indigo Girls that could be played. The centralized interface or panel 500 appears in the lower right hand corner of the screen and prompts the user to select what the user meant. In this manner, the user is less confused as to how to operate with the display even though the centralized panel can be used with one or more application modules 310.

Figure 7:
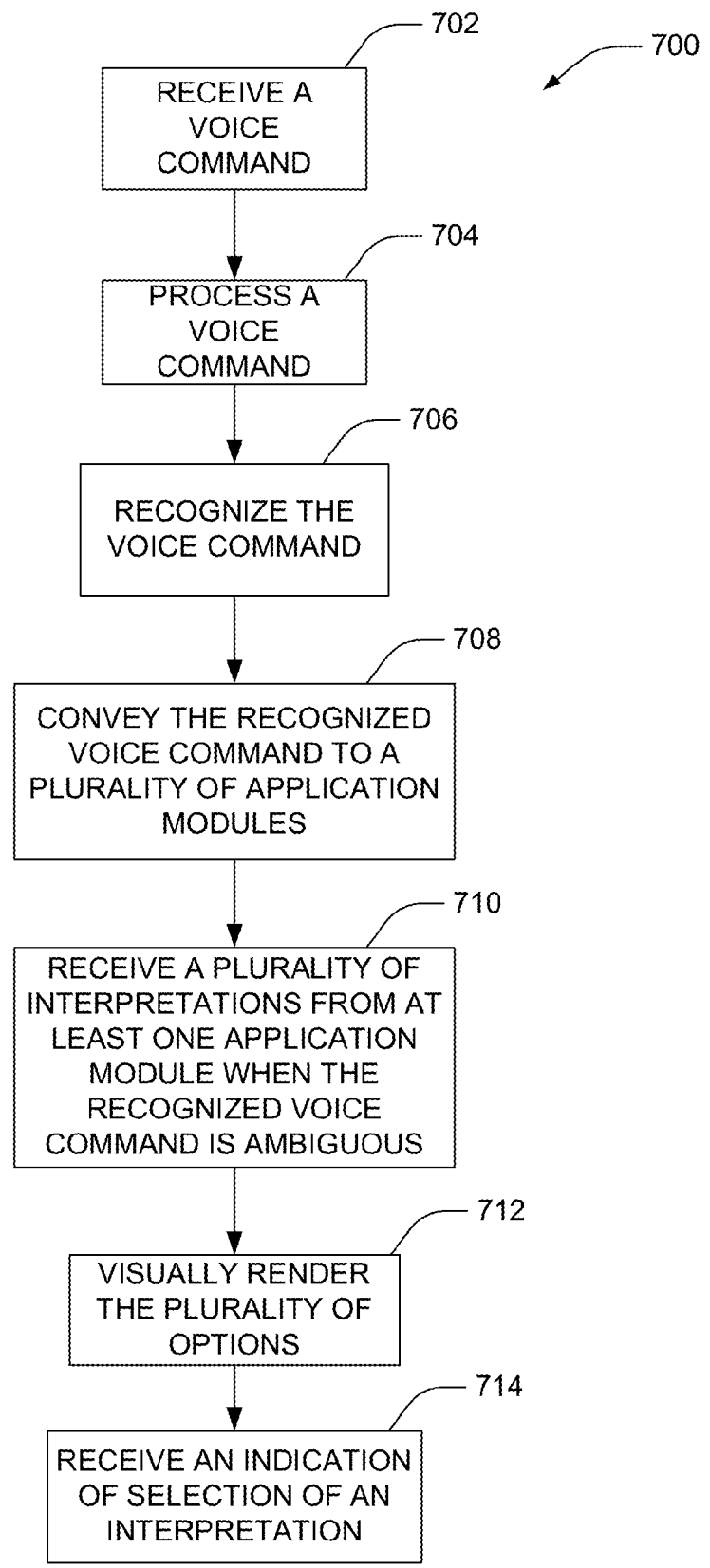
FIG. 7 illustrates a flowchart of a method for facilitating centralized user interaction.

FIG. 7 illustrates a flowchart 700 for providing a computer-implemented method of facilitating centralized interaction with a user. Flowchart 700 includes step 702 that entails receiving a voice command from a user. After receiving the voice command, flowchart 700 proceeds to step 704 to process the voice command such that it is in appropriate condition to be recognized by a speech recognizer. At step 706, a speech recognizer, such as speech recognizer 306 of FIG. 3 recognizes the voice command. The speech recognizer compares the voice command to a plurality of commands stored in an index.

At step 708, the recognized command is conveyed to a plurality of application modules. At step 710, a plurality of interpretations are received upon at least one of the plurality of application modules determining that the recognized command is ambiguous. The plurality of interpretations are visually rendered to the user at step 712. For example, the plurality of interpretations can be listed with a corresponding identifier on a centralized panel of a display. An indication of the user selection of one of the plurality of interpretations is received at step 714. For example, by audibly indicating the identifier, the desired interpretation can be identified as the correct command.

In addition to clarifying voice commands by interacting with centralized interface module 312 in FIG. 3, a user can also interact with centralized interface module 312 to correct recognition errors while the user is dictating to an application module, such as a word processing application. To correct recognition errors, the user can highlight a term that has been transcribed incorrectly by using an input device. After highlighting, the application module transmits a plurality of alternatives to centralized interface module 312. The alternatives contain phrases that sound similar to the voice utterance. Centralized interface module 312 receives and visually renders the alternative phrases on the centralized panel of display 314. Each of the alternative phrases includes a corresponding identifier. Centralized interface module 312 receives an indication of selection from the user via speech or input device 316 in the form of an identifier and conveys the selection to the application module.

In some instances, the centralized interface module 312 fails to visually render an alternative that is the correct alternative. Failure to render a correct alternative can occur if either speech recognizer 306 made a misrecognition error or if the alternative is not recognizable because the user has never used the utterance with system 300. With these types of occurrences, centralized interface module 312 is configured to present further alternatives in addition to the alternatives previously presented. One such alternative includes presenting an option to respeak the original utterance. Another such further alternative includes presenting an option to allow the user to create a new alternative that is otherwise unfamiliar to system 300.

Figures 8, 9:
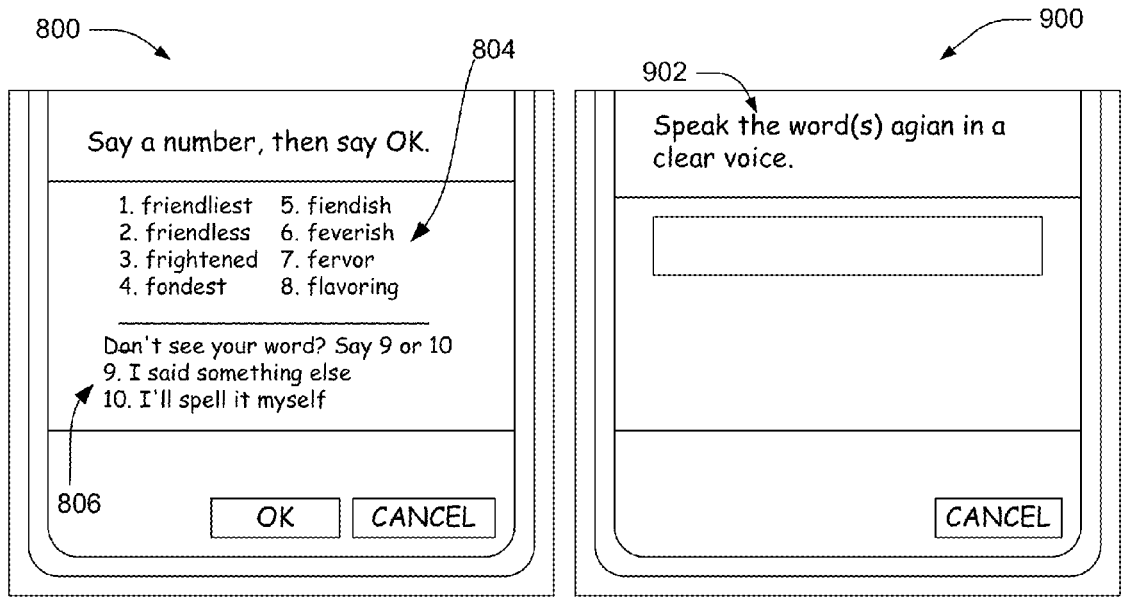
FIG. 8 illustrates an example screenshot of a centralized panel.
FIG. 9 illustrates an example screenshot of a centralized panel.

For example, FIG. 8 illustrates a screenshot 800 of a centralized panel that is visually rendering a list of alternatives in accordance with an embodiment of the present invention. The list of alternatives include a list of alternative phrases 804 generated by a word processing application and a list of further alternatives 806 generated by centralized interface module 312. Each of the further alternatives 806 includes a corresponding identifier such that the user can make an indication of selection in the form of an identifier.

Figure 10:
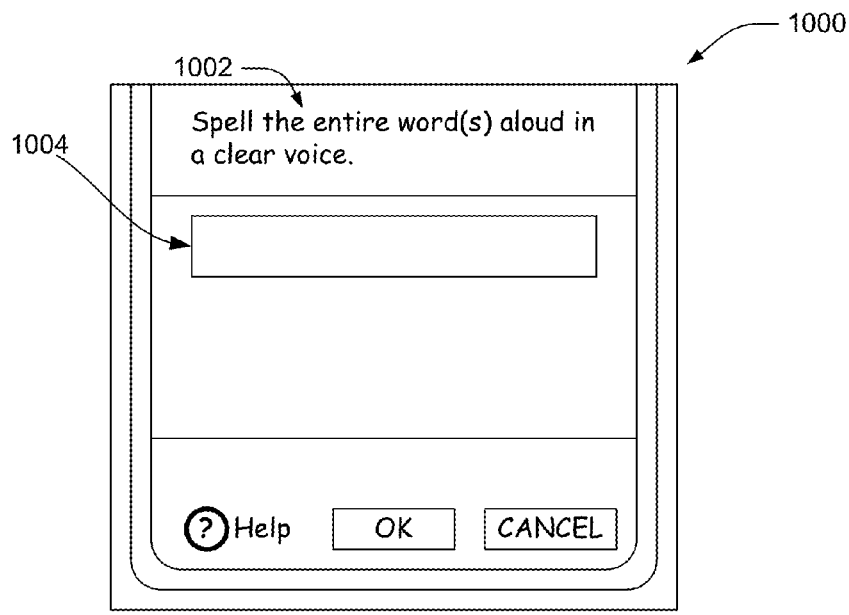
FIG. 10 illustrates an example screenshot of a centralized panel.

If the user selects identifier "9", then the centralized interface module 312 visually renders a screenshot 900 in a centralized panel as illustrated in FIG. 9. The communication line 902 of screenshot 900 prompts the user to respeak the utterance. Upon respeaking the utterance, centralized interface module 312 will visually render a refreshed list of alternatives. Selecting identifier "9" is useful if system 300 has made a recognition error. If the user selects the identifier "10" in FIG. 8, then centralized interface module 312 visually renders screenshot 1000 in a centralized panel as illustrated in FIG. 10. Communication line 1002 of screenshot 1000 prompts the user to spell the utterance aloud. As the user spells the utterance, the letters will appear in block 1004. In addition, it is possible that a user could also type the correct spelling of the utterance in block 1004 using an input device.

Figure 11:
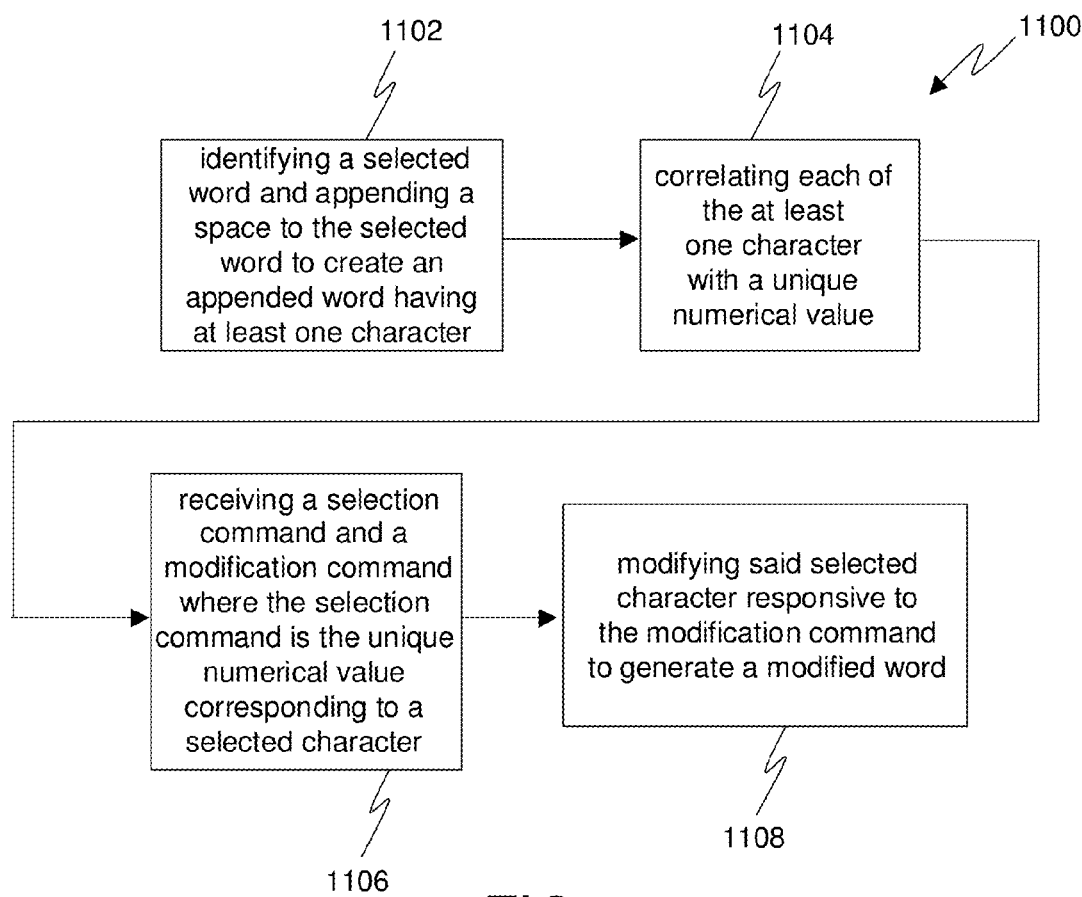
FIG. 11 is a block diagram illustrating a method for manipulating characters displayed on a centralized panel using a speech recognizer.
Figure 12:
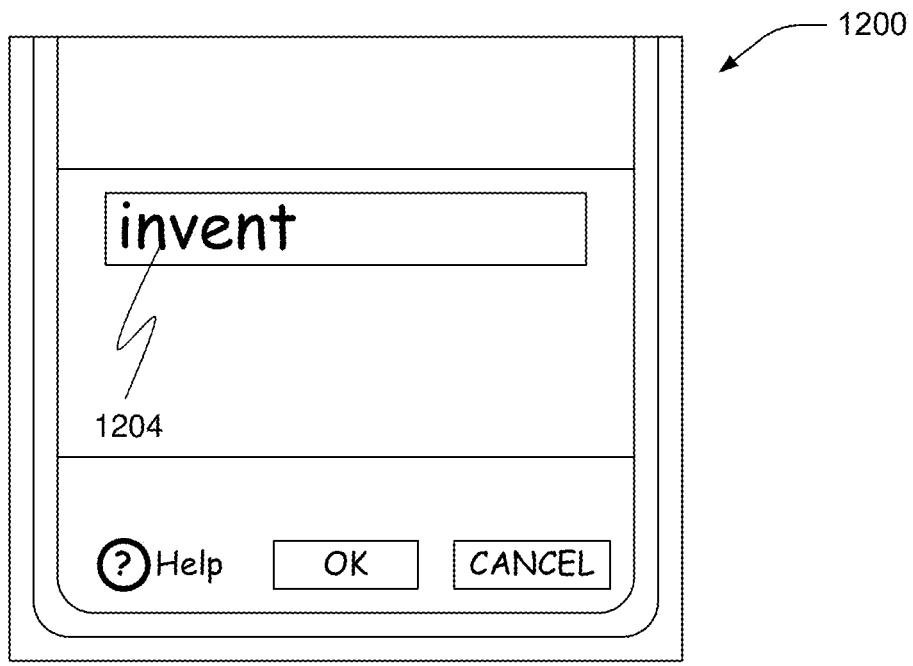
FIG. 12 illustrates an example screenshot of a centralized panel.

In another embodiment of the present invention, FIG. 11 is a block diagram illustrating a method 1100 for manipulating characters displayed on a centralized panel, such as screenshot 1000 of a centralized panel illustrated in FIG. 10, after the user audibly spells a new alternative. For example, in FIG. 12, the user spells the following phrase, "intent". However, the speech recognizer 306 (FIG. 3) has "heard" the series of entered text 1204 as "i", "n", "v", "e", "n", "t" and thus, displays the word "invent" on panel 1200. The word "invent" needs to be corrected to be "intent."

Figure 13:
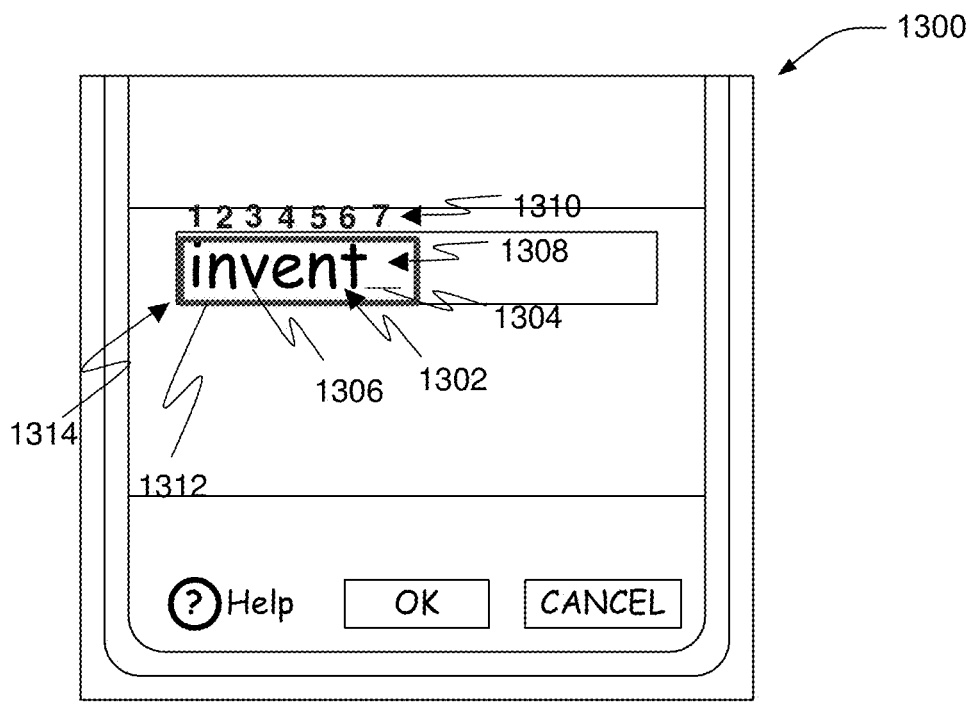
FIG. 13 illustrates an example screenshot of a centralized panel.

Referring to FIG. 13, in order to correct this, the user invokes a spelling command to vocally communicate a command to modify "invent". Upon the system 300 receiving the spelling command, the selected word is identified and an appended word 1302 is created by appending at least one space 1304 to the selected word, wherein the appended word 1302 includes at least one character 1306 to be modified, as shown in operational block 1102 (FIG. 11). Each of the characters 1308 in the appended word are then assigned and correlated with a unique numerical value 1310, as shown in operational block 1104. The appended word 1302 is then displayed via screenshot 1300 of a centralized panel to visually communicate the correlation between each of the characters 1308 in the appended word 1302 and their assigned unique numerical value 1310. This correlation may be visually communicated by drawing a box 1312 around the appended word 1302 on screenshot 1300 and displaying each of the unique numerical values 1310 adjacent their assigned character 1308 in the appended word 1302. As such, each of the characters 1308 is "assigned" a unique numerical value 1310 to which each character 1308 is correlated. For example, a user who wants to change the word "invent" 1314 to "intent", would vocally enter a command to speech recognizer 306. This would cause a box 1312 to be displayed on screenshot 1300 around the word "invent" 1314. This also causes each letter in the word "invent" 1314 to be assigned a unique numerical value 1310 which is displayed adjacent its corresponding character 1308, both of which is shown in FIG. 13. This will allow the user to change and/or correct any letter in the word "invent."

At this point, a selection command and a modification command may be received by system 300, wherein the selection command is the unique numerical value 1310 corresponding to a selected character, as shown in operational block 1106. This indicates to system 300 which character in the appended word 1302 is to be changed. Once system 300 receives the modification command a modified word is generated by modifying the selected character responsive to the modification command, as shown in operational block 1108. It should be appreciated that the user may enter in a plurality of modification commands, such as "delete", "insert", or the letter/character to be added, wherein each of these situations are discussed below.

Figure 14:
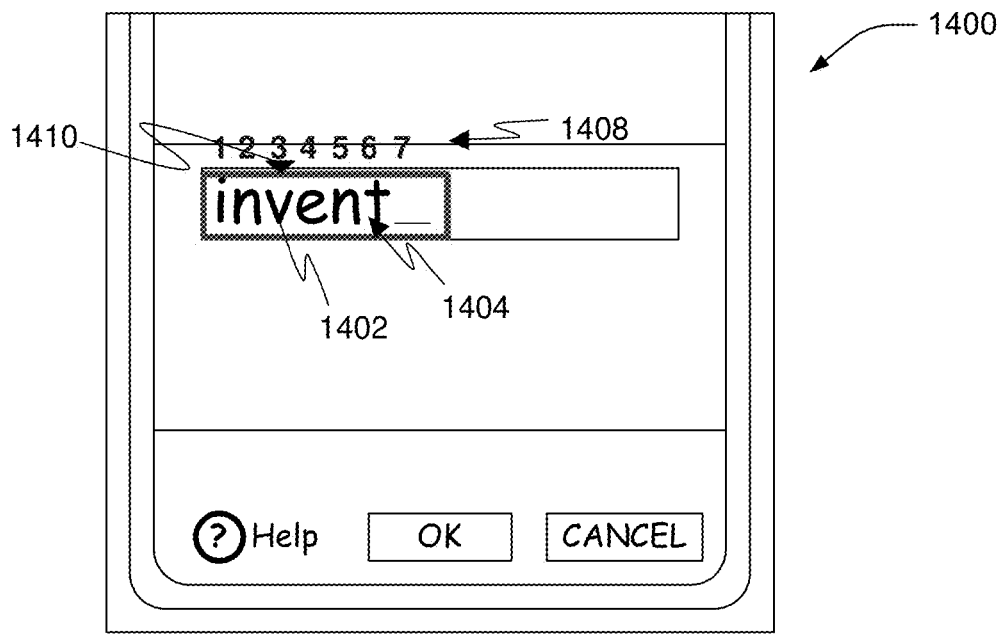
FIG. 14 illustrates an example screenshot of a centralized panel.
Figure 15:
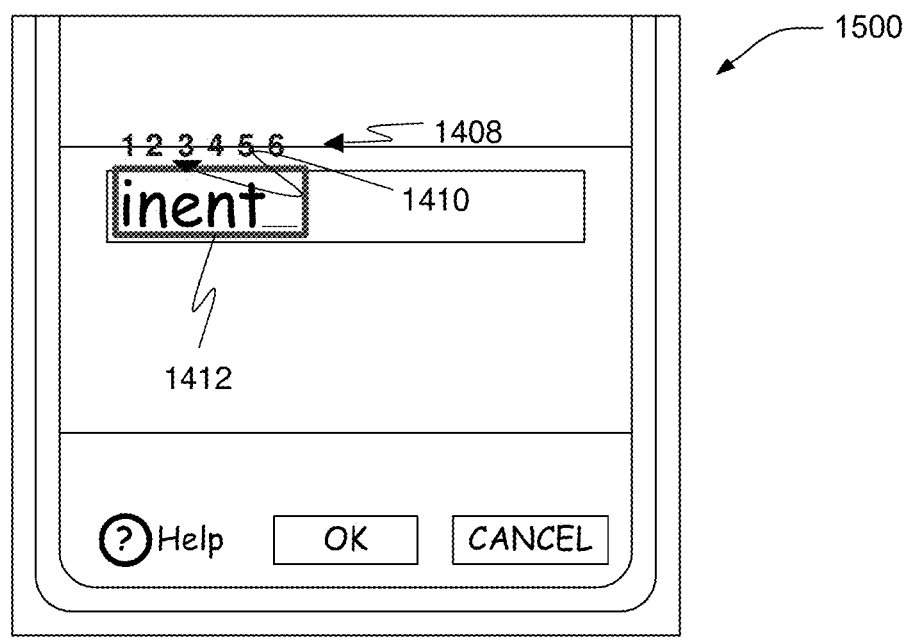
FIG. 15 illustrates an example screenshot of a centralized panel.

For example, referring to FIG. 14, consider the case above where the user would like to delete the letter "v" 1402 in the appended word "invent_" 1404 displayed on a screenshot 1400 of a centralized panel. As discussed herein, the user communicates the unique numerical value corresponding to the character to be change to system 300. It should be appreciated that although these unique numerical values 1408 start with the number 1 and increase by 1, any unique numerical values 1408 and increments may be assigned. As can been seen, the letter "v" 1402 in the appended word "invent_" 1404 is assigned a unique numerical value 1408 of "3". As such, the user would vocally communicate the number "3" to system 300. This selects the letter corresponding to and correlated with the number "3" as indicated by the caret 1410, which in this case is the letter "v" 1402 in the appended word "invent" 1404. The user may then enter the desired modification command, such as "delete" which will cause the letter "v" 1402 to be deleted from the appended word "invent" 1404, leaving the resultant "inent" 1412, as shown in screenshot 1500 of a centralized panel of FIG. 15. Thus, the modification command "delete" will remove the selected letter and its corresponding space from the appended word and the selection caret 1410 will select the next subsequent character, i.e. "e."

Figure 16:
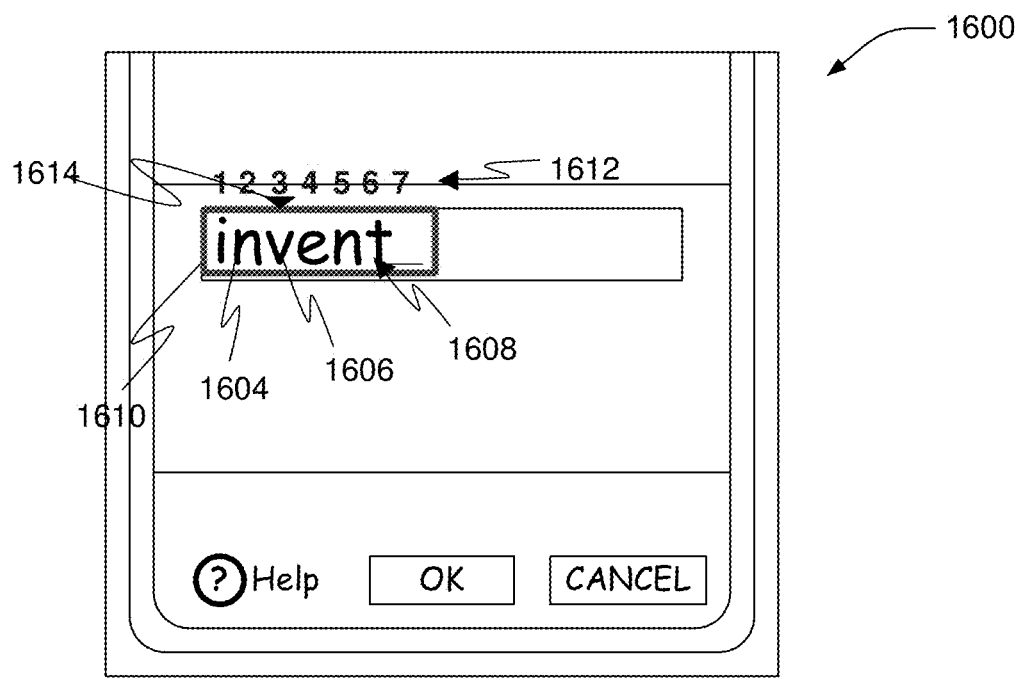
FIG. 16 illustrates an example screenshot of a centralized panel.
Figure 17:
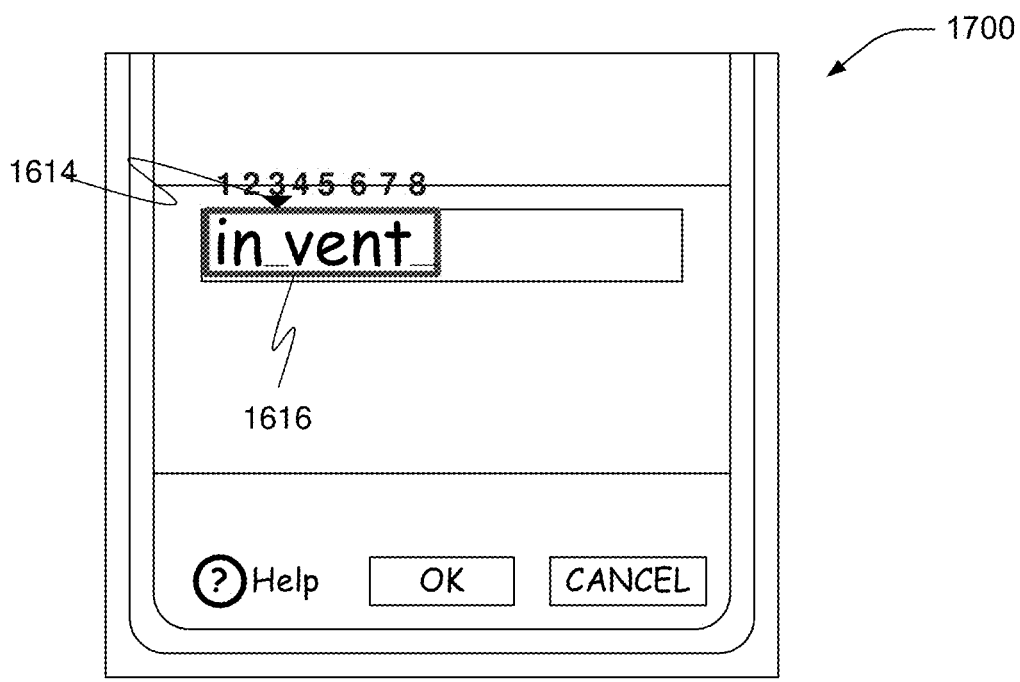
FIG. 17 illustrates an example screenshot of a centralized panel.
Figure 18:
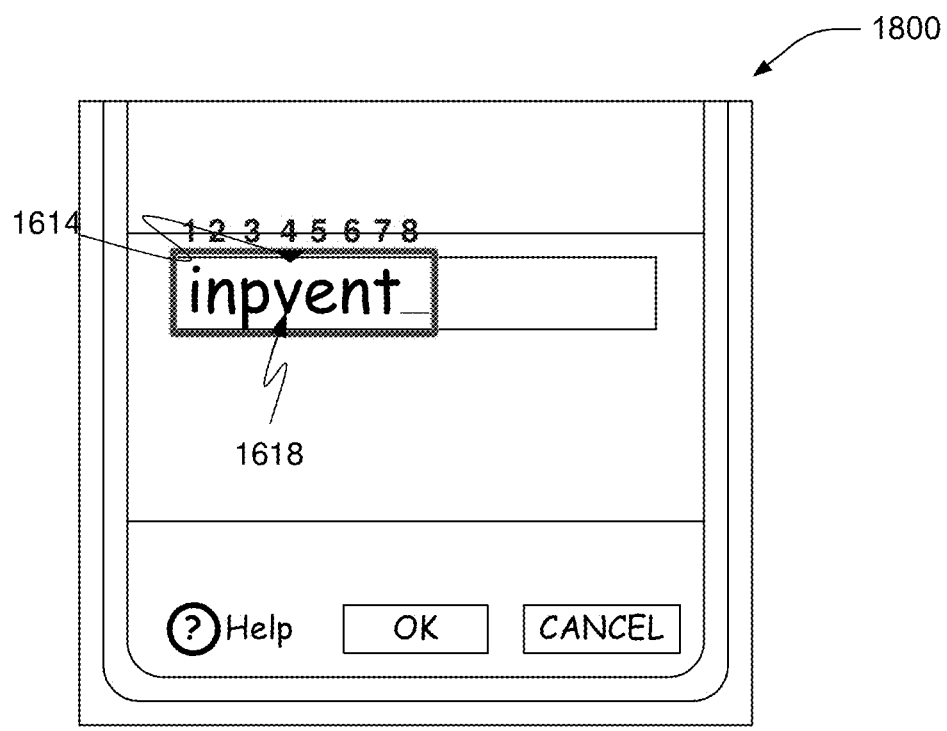
FIG. 18 illustrates an example screenshot of a centralized panel.
Figure 19:
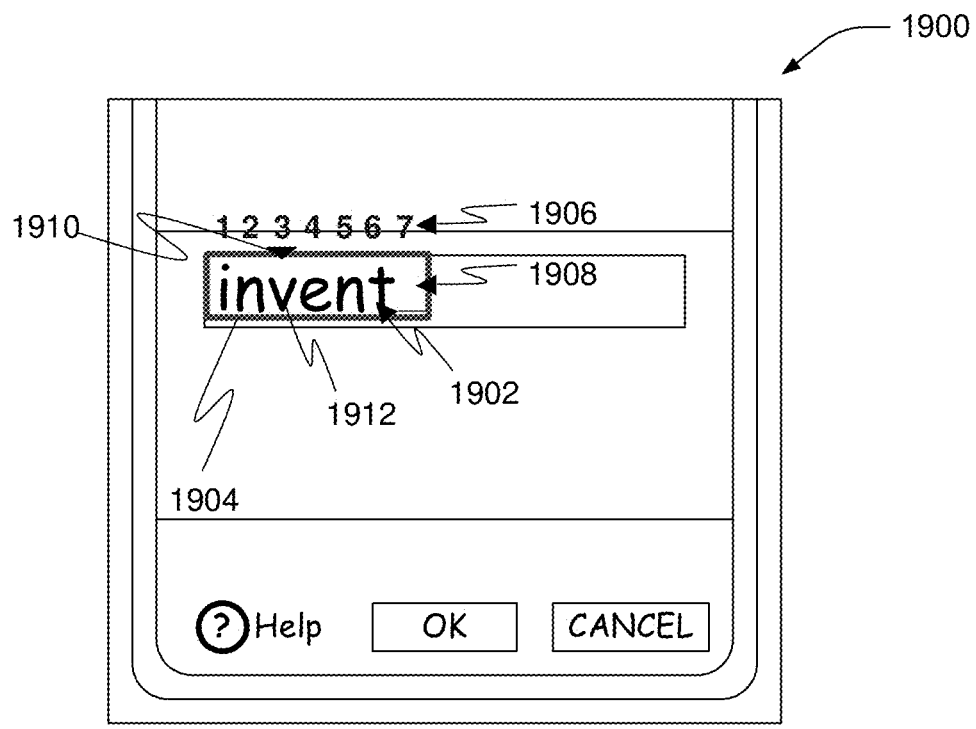
FIG. 19 illustrates an example screenshot of a centralized panel.
Figure 20:
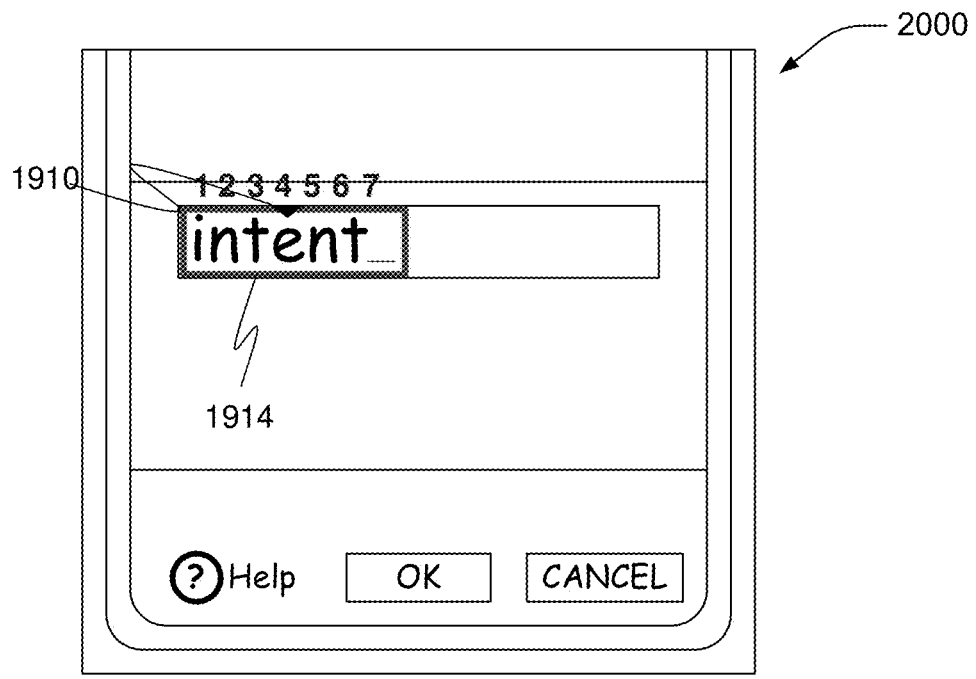
FIG. 20 illustrates an example screenshot of a centralized panel.

On the other hand, referring to FIG. 16, consider the case where the user wants to insert a character, such as a letter or space, between the letter "n" 1604 and the letter "v" 1606 in the word "invent" displayed on screenshot 1600 in a centralized panel. In essence, the user wants to insert a character into the spot corresponding to the unique numerical value "3". As discussed herein, the user may vocally communicate a command. This causes a space to be appended to the word "invent" to create an appended word "invent_" 1608 and a box 1610 to be displayed around the appended word "invent_" 1608 and unique numerical values 1612 to be assigned and displayed adjacent each of the characters in the appended word "invent_" 1608. As can be seen, the letter "v" 1606 in the appended word "invent_" 1608 is assigned a unique numerical value 1612 of "3". As such, the user can vocally communicate the number "3" to system 300 to "select" the letter corresponding to and correlated with the number "3" as indicated by the caret 1614, which in this case is the letter "v" 1606 in the appended word "invent_" 1608. The user may then enter in a modification command, causing system 300 to respond in an appropriate manner. For example if the user communicates the modification command "insert" and then communicates the word "space", then a space will be inserted between the letter "n" 1604 and the letter "v" 1606, effectively changing the appended word "invent_" 1608 to "in_vent_" 1616, as shown in screenshot 1700 in a centralized panel illustrated in FIG. 17. In this case the caret 1614 would remain in place to indicate that the space correlated with the unique numerical value "3" has been selected. However, if the user communicates the command "insert" and then communicates the letter "p", then the letter "p" will be inserted between the letter "n" 1604 and the letter "v" 1606, effectively changing the appended word "invent_" to "inpvent_" 1618, as shown in screenshot 1800 of a centralized panel illustrated in FIG. 18, and the selection caret 1614 will shift to the following character to indicate that the following character (i.e. the character corresponding to the unique numerical value "4") has been selected. Similarly, referring to FIG. 19, consider the case where the user simply wants to change a letter in the word "invent" displayed on screenshot 1900 of a centralized panel. As discussed herein, the user may vocally communicate a command. This causes a space to be appended to the word "invent" to create an appended word "invent_" 1902 and a box 1904 to be displayed around the appended word "invent_" 1902 and unique numerical values 1906 to be assigned and displayed adjacent each of the characters 1908 in the appended word "invent_" 1902. As can been seen, the letter "v" 1912 in the appended word "invent_" 1902 is assigned a unique numerical value 1906 of "3." As such, the user can vocally communicate the number "3" to system 300. This causes the letter corresponding to and correlated with the number "3" to be selected as indicated by the caret 1910, which in this case is the letter "v" 1912 in the appended word "invent_" 1902. The user may then enter in a modification command (in this case the command is simply a letter) causing system 300 to respond in an appropriate manner. For example if the user communicates the modification command "t" after the number "3", then the letter "v" 1912 will be replaced with the letter "t", effectively changing the appended word "invent_" 1902 to the word "intent" 1914, as shown in screenshot 2000 of a centralized panel illustrated in FIG. 20. At this point the selection caret 1910 will shift to the following character to indicate that the following character (i.e. the character corresponding to the unique numerical value "4") has been selected.

Figure 21:
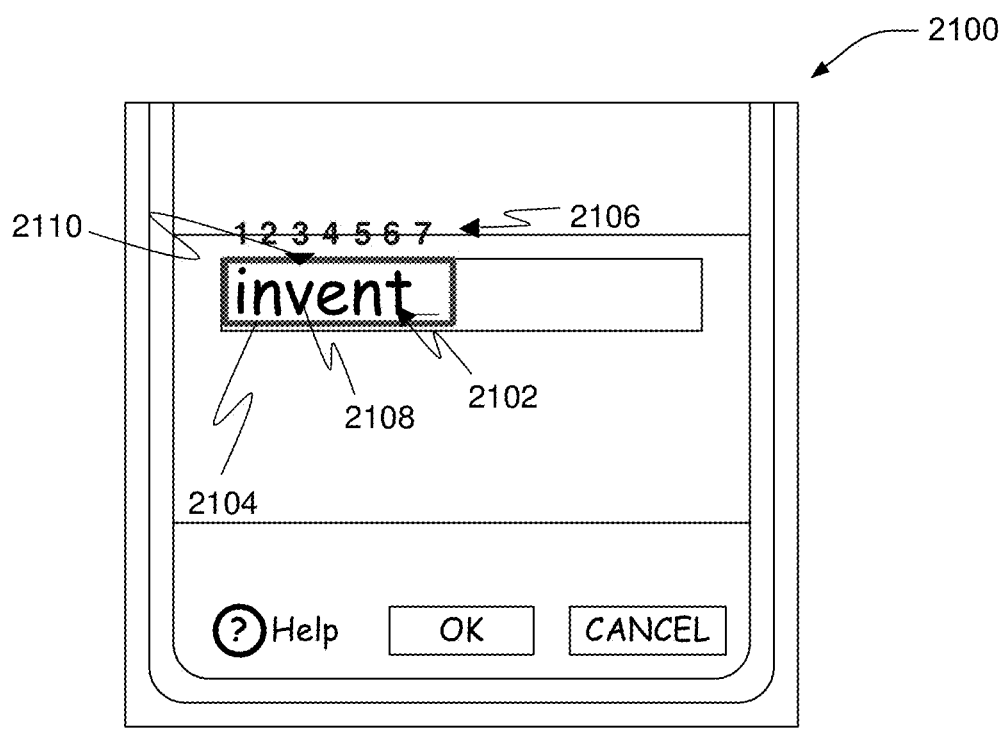
FIG. 21 illustrates an example screenshot of a centralized panel.
Figure 22:
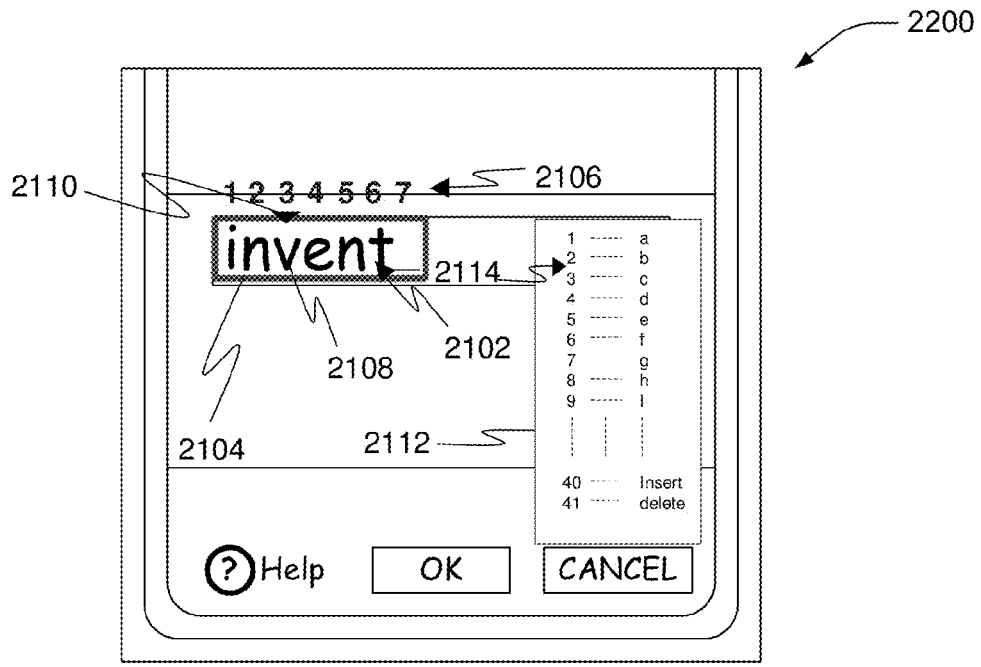
FIG. 22 illustrates an example screenshot of a centralized panel.
Figure 23:
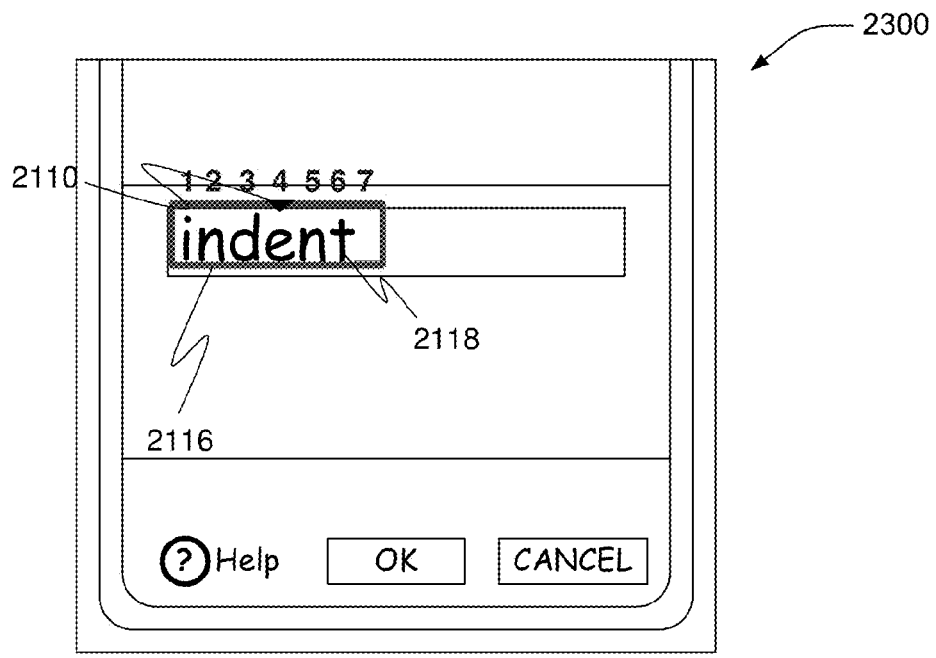
FIG. 23 illustrates an example screenshot of a centralized panel.

It should be appreciated that once a user enters the unique numerical value corresponding to the letter to be changed, a menu of suggested modification commands may be displayed, such as a dropdown menu, where each suggested action would be assigned is own unique numerical value. For example, referring to FIG. 21, consider the case where the user wants to change a letter in the word "invent" displayed on screenshot 2100 of a centralized panel. The user vocally communicates a command. This causes a space to be appended to the selected word "invent" to create an appended word "invent_" 2102 and a box 2104 to be displayed around the appended word "invent_" 2102 and unique numerical values 2106 to be displayed adjacent each of the letters in the appended word "invent_" 2102. As can been seen, the letter "v" 2108 in the appended word "invent_" 2102 is assigned a unique numerical value 2106 of "3." As such, the user would vocally communicate the number "3" to system 300 to "select" the character corresponding to and correlated with the unique numerical value "3" as indicated by the caret 2110, which in this case is the letter "v" 2108 in the appended word "invent_" 2102. Referring to FIG. 22, a menu 2112 may be displayed on centralized panel shot 2200 giving the user a number of modification command choices, each of which is assigned a second unique numerical value 2114. The user may then enter a modification command which is the second unique numerical value 2114 correlated with the desired modification command causing the speech recognition software application to respond in an appropriate manner. For example, if the user communicates the numerical value "4" after the number "3" then the letter "v" 2108 will be replaced with the letter "d" 2116, effectively changing the appended word "invent_" 2102 to the word "indent" 2118, as shown in screenshot 2300 of a centralized panel in FIG. 23. As above, the selection caret 2110 will shift to the following character to indicate that the following character (i.e. the character corresponding to the unique numerical value "4") has been selected.

It should be appreciated that the menu 2112 of suggested modification commands may include any modification commands suitable to the desired end purpose, such as a menu of characters/words that are acoustically similar to the selected letter or word, e.g. if "v" is selected, then the menu 2112 will contain "d", "t", "e", "g", "3". Additionally, the menu 1012 may also contain the capitalized form of the characters, e.g. "V", as well as an auto-complete list from a spell checker. As such, for this example the menu 1012 may include the words "indent", "intent", "amend." Furthermore, it should be appreciated that the present invention may include voice commands that performing multiple functions simultaneously, e.g. "Change 3 to "e" as in eagle," or "Change t to g" may change the letter "t" to the letter "g" if there were only one letter "t" in the selected word. If there were two letters "t" in the selected word, feedback may be provided to the user to be more precise. Moreover, other commands may also be provided such as "undo" which may revert previously changed characters to their previous state, e.g. if the user says "cap that" (to capitalize the selected letter), but the input is recognized as "caret", then the user may say "undo" to revert the letter to the previous state.

With reference to FIGS. 8-23, these figures are discussed in the context of a user dictating to a word processing application. However, those skilled in the art will recognize that the embodiments discussed in FIGS. 8-23 can also apply to a user uttering a voice command to system 300. If a voice command is ambiguous, centralized interface module 312 will visually render a list of interpretations and also visually render a list of further alternatives. The list of further alternatives include an alternative to respeak the command and an alternative to create a new command. For example, if the user would like to send email to David White, the user can audibly issue the command "insert the name David". However, if the user has previously sent email to David Black and David Green, but never has sent email to David White, there is an ambiguity as to what David to insert. Centralized interface module 312 visually renders a list of David interpretations. The list of interpretations includes David Black and David Green. In addition, centralized interface module 312 visually renders a list of further alternatives that includes an alternative to respeak the voice command and an alternative to create a new voice command. In this example, the user would choose to create a new command because the user desires to email David White, which is unfamiliar to system 300.

In addition to clarifying commands and correcting misrecognition errors by interacting with a centralized interface module 312, a user can also interact with centralized interface module 312 to receive feedback from the plurality of application modules 310. Centralized interface module 312 is configured to visually render what system 300 is listening for. For example, the centralized panel can display that system 300 is listening for nothing because microphone 302 is turned off. In addition, centralized interface module 312 is also configured to visually render the status of system 300. For example, the centralized panel can display the last command recognized by system 300. In another embodiment, the centralized panel can display that a particular application module is opening or closing.

Although the present invention has been described with reference to particular embodiments, workers skilled in the art will recognize that changes may be made in form and detail without departing from the spirit and scope of the invention.

What is claimed is:

1. A computing device implemented method comprising:
receiving, at a module, first information corresponding to a first set of commands associated with a first application module;
receiving, at the module, second information corresponding to a second set of commands associated with a second application module;
obtaining, by the module, a voice command, recognized by processing a user input using a speech recognizer;
based at least in part on the module determining, using the first information, that the voice command includes at least one word corresponding to a first object or a first action included in at least a first command included in the first set of commands,
obtaining a first indication of the correspondence between the voice command and the first command;
based at least in part on the module determining, using the second information, that the voice command includes at least one word corresponding to a second object or a second action included in at least a second command included in the second set of commands,
obtaining a second indication of the correspondence between the voice command and the second command;
based at least in part on the first indication and the second indication, preparing a list of third information corresponding, respectively, to the first command associated with the first application module and the second command associated with the second application module;
visually rendering items in the list of third information on a display;
receiving an indication of a user selection of one of the items in the list of third information, wherein the selected item corresponds to a selected one of the first or second command; and
in response to the indication of the user selection, automatically executing the selected command associated with the first application module or the second application module.

2. The computing device implemented method of claim 1, and further comprising:
receiving a voice input from the user; and
processing, by the speech recognizer, the voice input to recognize the voice command.

3. The computing device implemented method of claim 2, wherein the module comprises an interface module that is communicatively coupled to the first application module, the second application module, and the speech recognizer.

4. The computing device implemented method of claim 1, wherein the module comprises a grammar generator module configured to generate a grammar based on the first and second information.

5. The computing device implemented method of claim 1, and further comprising determining that the voice command is ambiguous based on at least one of:
a determination that the voice command can be executed to perform more than one action; or
a determination that more one than one different application module can execute the voice command; and
wherein the module obtains the first and second indications based on the determination that the voice command is ambiguous.

6. The computing device implemented method of claim 1, wherein each of the items in the list corresponds to an action performable by one of the first or second application modules.

7. The computing device implemented method of claim 6, wherein visually rendering the items in the list comprises:
for each item in the list, visually identifying which of the first or second application modules corresponds to the item.

8. The computing device implemented method of claim 7, and further comprising:
identifying an action, that corresponds to the item selected from the list;
identifying one of the first or second application module that corresponds to the identified action; and
providing an indication of the identified action to the identified application module.

9. A computing system comprising:
a processor; and
memory storing instructions executable by the processor, wherein the instructions, based at least on execution, configure the computing system to:
receive first information corresponding to a first set of commands associated with a first application module;
receive second information corresponding to a second set of commands associated with a second application module;
store the first and second information in a data store;
identify a voice command received from a user and recognized based at least in part on using a speech recognizer;

based at least in part on a determination, using the stored first information, that the voice command includes at least one word corresponding to a first object or a first action included in at least a first command included in the first set of commands, obtain a first indication of the correspondence between the voice command and the first command;

based at least in part on a determination, using the stored second information, that the voice command includes at least one word corresponding to a second object or a second action included in at least a second command included in the second set of commands, obtain a second indication of the correspondence between the voice command and the second command;

based at least in part on the first indication and the second indication, prepare a list of third information corresponding, respectively, to the first command associated with the first application module and the second command associated with the second application module;

visually render items in the list of third information on a display;

for each item in the visually rendered list, visually identify on the display which of the first or second application modules corresponds to the item;

receive an indication of a user selection of one of the items in the list of third information, wherein the selected item corresponds to a selected one of the first or second command; and based on the indication of the user selection, automatically execute the selected command.

10. The computing system of claim 9, wherein the instructions configure the computing system to:
receive a voice input from a user; and
process the voice input using a speech recognizer to recognize the voice command.

11. The computing system of claim 9, wherein the instructions configure the computing system to:
generate a grammar based on the first and second information; and
recognize the voice command based on the grammar.

12. The computing system of claim 9, wherein the instructions configure the computing system to:
determine that the voice command is ambiguous, wherein the first and second indications are obtained based on the determination that the voice command is ambiguous.

13. The computing system of claim 12, wherein the voice command is determined to be ambiguous based on at least one of:
a determination that the voice command can be executed to perform more than one action; or
a determination that more than one different application module can execute the voice command.

14. The computing system of claim 9, wherein each of the items in the list corresponds to an action performable by one of the first or second application modules.

15. The computing system of claim 9, wherein the instructions configure the computing system to:
identify an action that corresponds to the item selected from the list;
identify one of the first or second application module that corresponds to the identified action; and
provide an indication of the identified action to the identified application module.

16. A computer-implemented method comprising:
receiving, at an interface module, first information corresponding to a first set of commands associated with a first application module;
receiving, at the interface module, second information corresponding to a second set of commands associated with a second application module;
obtaining a voice command recognized using a speech recognizer that processes a speech input from a user;
obtaining, based on the first information, a first indication of a correspondence between the voice command and a first command associated with the first application module, wherein the first indication is based on a determination that the voice command includes at least one word corresponding to a first object or a first action included in the first command;
obtaining, based on the second information, a second indication of a correspondence between the voice command and a second command associated with the second application module, wherein the second indication is based on a determination that the voice command includes at least one word corresponding to a second object or a second action included in the second command;
based on the first and second indications, generating a list of items, each item in the list corresponding to at least one of the first or second commands;
rendering the list of items to the user;
receiving an indication of a user selection of one of the items in the list, wherein the selected item corresponds to a selected one of the first or second command; and
in response to the indication of the user selection, automatically executing the selected command associated with the first application module or the second application module.

17. The computer-implemented method of claim 16, wherein each of the items in the list is associated with an action performable by one of the first or second application modules, and wherein rendering the list of items comprises:
generating a user interface display that visually renders the list and, for each item in the list, visually identifies which of the first or second application modules corresponds to the action that is associated with the item.

18. The computer-implemented method of claim 17, and further comprising:
identifying an action that corresponds to the item selected from the list;
identifying one of the first or second application module that corresponds to the identified action; and
sending an indication of the identified action to the identified application module.

19. The computer-implemented method of claim 17, wherein the user interface display includes a user interface element that identifies, for each item in the list, which of the first or second application modules corresponds to the item.

20. The computer-implemented method of claim 16, and further comprising:
determining that the voice command is ambiguous based on at least one of:
the voice command being executable to perform more than one action; or
the voice command being executable by more than one different application module; and
wherein the voice command is provided to the first and second application modules based on the determination.

* * * * *